(12) United States Patent
Morita et al.

(10) Patent No.: US 9,442,182 B2
(45) Date of Patent: Sep. 13, 2016

(54) RADAR DEVICE

(71) Applicant: Panasonic Corporation, Osaka (JP)

(72) Inventors: Tadashi Morita, Kanagawa (JP); Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 14/402,297

(22) PCT Filed: Feb. 4, 2014

(86) PCT No.: PCT/JP2014/000598
§ 371 (c)(1),
(2) Date: Nov. 19, 2014

(87) PCT Pub. No.: WO2014/147941
PCT Pub. Date: Sep. 25, 2014

(65) Prior Publication Data
US 2015/0168540 A1    Jun. 18, 2015

(30) Foreign Application Priority Data
Mar. 21, 2013  (JP) .................................. 2013-058611

(51) Int. Cl.
*G01S 7/28*    (2006.01)
*G01S 7/282*   (2006.01)
(Continued)

(52) U.S. Cl.
CPC .............. *G01S 7/2813* (2013.01); *G01S 7/282* (2013.01); *G01S 7/2926* (2013.01); *G01S 13/0209* (2013.01); *G01S 13/284* (2013.01); *G01S 13/426* (2013.01); *G01S 7/023* (2013.01)

(58) Field of Classification Search
CPC ........................... G01S 7/2813; G01S 7/2926
USPC ......................................................... 342/21
See application file for complete search history.

(56) References Cited

U.S. PATENT DOCUMENTS 3,742,201 A * 6/1973 Groginsky ............ G06F 17/145
                                                    708/410
4,513,288 A * 4/1985 Weathers .............. G01S 13/288
                                                    342/189

(Continued)

FOREIGN PATENT DOCUMENTS

JP        2675683 B2     7/1997
JP     2001-251235 A     9/2001
(Continued)

OTHER PUBLICATIONS

Extended European Search Report dated Mar. 2, 2016, for corresponding EP Application No. 14767856.9-1812 / 2977785, 8 pages.
(Continued)

*Primary Examiner* — Peter Bythrow
*Assistant Examiner* — Helena Seraydaryan
(74) *Attorney, Agent, or Firm* — Seed Intellectual Property Law Group PLLC

(57) ABSTRACT

A transmission signal generator produces N transmission pulses for every transmission period from N (N: an integer of 2 or more) kinds of transmission code sequences and (N×M) (M: an integer of 2 or more) kinds of orthogonal code sequences, the transmission pulses being obtained by multiplying transmission codes of the N kinds of transmission code sequences, with selected N orthogonal codes of the (N×M) kinds of orthogonal code sequences. In one transmission period, a radio transmitter converts the N transmission pulses to high-frequency signals, and transmits the signals through a transmission antenna. The (N×M) kinds of orthogonal code sequences are code sequences which satisfy a predetermined mathematical expression in M transmission periods.

7 Claims, 16 Drawing Sheets

(51) Int. Cl.
*G01S 13/28* (2006.01)
*G01S 13/02* (2006.01)
*G01S 7/292* (2006.01)
*G01S 13/42* (2006.01)
*G01S 7/02* (2006.01)

(56) References Cited

U.S. PATENT DOCUMENTS

| | | | |
|---|---|---|---|
| 7,978,778 B2 * | 7/2011 | Wallace | H04B 7/0854 370/335 |
| 2004/0263382 A1 * | 12/2004 | Gottwald | G01S 7/285 342/70 |
| 2013/0176166 A1 | 7/2013 | Kishigami et al. | |
| 2014/0169441 A1 * | 6/2014 | Hadani | H04B 1/1027 375/233 |

FOREIGN PATENT DOCUMENTS

| | | |
|---|---|---|
| JP | 2012-83143 A | 4/2012 |
| WO | 2009/092393 A1 | 7/2009 |

OTHER PUBLICATIONS

International Search Report, mailed Mar. 11, 2014, for International Application No. PCT/JP2014/001147, 4 pages.

* cited by examiner

RADAR DEVICE

TECHNICAL FIELD

The disclosure relates to a radar apparatus which transmits transmission pulses of a high frequency.

BACKGROUND ART

A radar apparatus transmits transmission pulses of a high frequency (for example, microwave or millimeter wave) from a measuring point into a space for every transmission period, receives a reflected wave signal reflected from a target, and measures at least one of the distance and direction between the measuring point and the target.

As a prior art technique related to a distance measuring apparatus for measuring the distance between a measuring point and a target, for example, a distance measuring apparatus is known in which a plurality of transmission pulse signals (hereinafter, "transmission pulses") using different code sequences are transmitted in one transmission period, thereby improving the reception SNR (Signal to Noise Ratio) of reflected pulse signals (hereinafter, referred to as "reception pulses") that are reflected from a target.

CITATION LIST

Patent Literature

Patent Literature 1: JP-B-2675683

SUMMARY OF INVENTION

Technical Problem

The inventors have studied a radar apparatus which transmits transmission pulses of a high frequency (for example, millimeter wave). In Patent Literature 1, however, a plurality of transmission pulses using different code sequences are transmitted in one transmission period in a temporally overlapping manner, and therefore the configuration of the transmission system is complicated. Furthermore, interference occurs among the transmission pulses, and hence it is difficult to obtain a high reception SNR.

It is an object of the disclosure to, in order to solve the above-discussed problems, provide a radar apparatus in which interference among transmission pulses is suppressed by a simple configuration, and a high reception SNR is obtained.

Solution to Problem

The disclosure is directed to a radar apparatus wherein the apparatus includes: a transmission signal generator which produces N transmission pulses for every transmission period from N (N: an integer of 2 or more) kinds of transmission code sequences and (N×M) (M: an integer of 2 or more) kinds of orthogonal code sequences, the transmission pulses being obtained by multiplying transmission codes of the N kinds of transmission code sequences, with selected N orthogonal codes of the (N×M) kinds of orthogonal code sequences; and a radio transmitter which, in one transmission period, converts the N transmission pulses to high-frequency signals, and transmits the signals through a transmission antenna, the (N×M) kinds of orthogonal code sequences are code sequences which satisfy a predetermined mathematical expression in M transmission periods, and, in the predetermined mathematical expression, CNM is an orthogonal code which is multiplied with an N-th transmission code in an M-th transmission period.

Advantageous Effects of Invention

According to the disclosure, interference among transmission pulses can be suppressed by a simple configuration, and a high reception SNR can be obtained.

DESCRIPTION OF EMBODIMENTS

Hereinafter, embodiments of the radar apparatus of the disclosure will be described with reference to the drawings.

(First Embodiment)

A radar apparatus 100 of the embodiment multiples, in one transmission period T, N different transmission codes with an orthogonal code which will be described later, to sequentially produces N transmission pulses, converts the transmission pulses to high-frequency signals, and transmits the signals through a transmission antenna. For every M transmission periods T, the radar apparatus 100 repeats transmission of transmission pulses which are converted to (N×M) high-frequency signals. Hereinafter, also a transmission pulse which is converted to a high-frequency signal is referred to as a transmission pulse.

In one transmission period, moreover, the radar apparatus 100 sequentially receives N reflected high-frequency signals which are obtained by reflecting the N transmission pulses from a target, and calculates N correlation values between the N transmission pulses, and a reception signal (hereinafter, referred to as "reception pulse") in which the N reflected wave signals that are received at any time are down-converted to baseband. The radar apparatus 100 measures (ranging) the distance between the radar apparatus 100 and the target, based on (N×M) correlation values which are calculated over the M transmission periods.

N and M are integers of 2 or more. The transmission period is a fixed value which is predetermined with assumption of the distance (for example, 50 m) which can be measured by the radar apparatus 100. In the following embodiments, it is assumed that the time period between the transmission timing of the transmission pulse and the reception timing does not exceed the transmission period.

Figure 1:
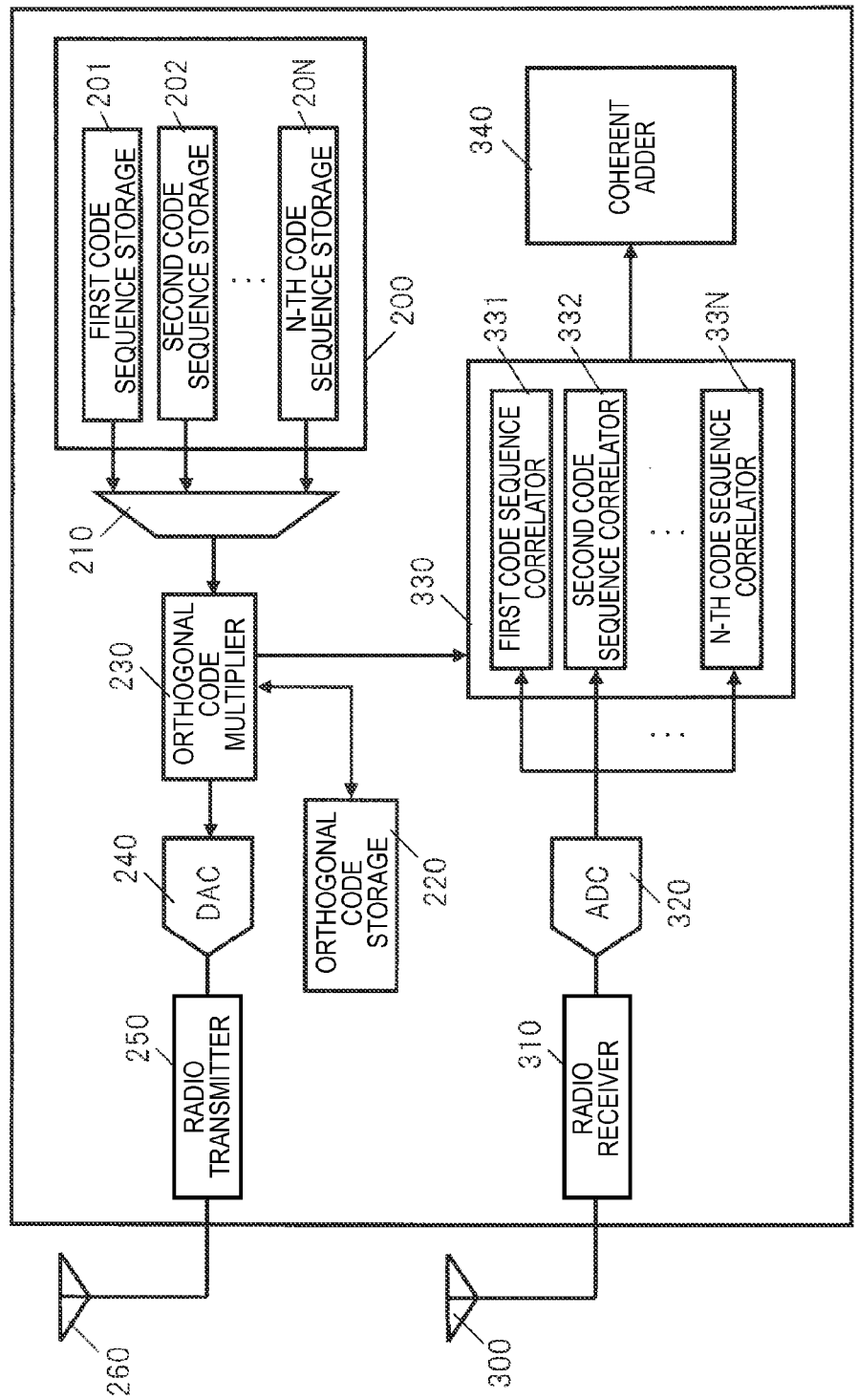
FIG. 1 is a block diagram showing the internal configuration of a radar apparatus of a first embodiment.

FIG. 1 is a block diagram showing the internal configuration of the radar apparatus 100 of the first embodiment. The radar apparatus 100 shown in FIG. 1 includes a code sequence storage 200, a selector 210, an orthogonal code storage 220, an orthogonal code multiplier 230, a DAC (Digital Analog Converter) 240, a radio transmitter (RF transmitter) 250 to which a transmission antenna 260 is connected, a radio receiver (RF receiver) 310 to which a reception antenna 300 is connected, an ADC (Analog Digital Converter) 320, a code sequence correlator 330, and a coherent adder 340.

The code sequence storage 200 which functions as a transmission code storage includes a first code sequence storage 201, and a second code sequence storage 202 to an N-th code sequence storage 20N, and stores N kinds of different transmission code sequences. The code sequence correlator 330 which functions as a correlation calculator includes a first code sequence correlator 331, and a second code sequence correlator 332 to an N-th code sequence correlator 33N, or has N kinds of different correlators the number of which is equal to that of the kinds of the transmission code sequences.

A transmission signal generator in the radar apparatus 100 of the embodiment can be configured by using at least the code sequence storage 200, the selector 210, the orthogonal code storage 220, and the orthogonal code multiplier 230.

The first code sequence storage 201 stores a first transmission code sequence (hereinafter, referred to as "first code sequence") An which is used for producing the transmission pulses by the radar apparatus 100, and outputs the transmission code sequence An to the selector 210. Here, n indicates the ordinal of the transmission period of the transmission pulse, and is an integer in the range of 1 to M. The same shall apply hereinafter.

The second code sequence storage 202 stores a second transmission code sequence (hereinafter, referred to as "second code sequence") Bn which is used for producing the transmission pulses by the radar apparatus 100, and outputs the transmission code sequence Bn to the selector 210.

Similarly, the N-th code sequence storage 20N stores an N-th transmission code sequence (hereinafter, referred to as "N-th code sequence") Dn which is used for producing the transmission pulses by the radar apparatus 100, and outputs the transmission code sequence Dn to the selector 210.

The transmission code sequences An, Bn to Dn are different code sequences. However, they may be arbitral code sequences, or pulse code sequences including, for example, a known code sequence such as an M-sequence, a Gold code sequence, a Golay code sequence, a complementary code sequence, or a Spano code sequence. Moreover, the transmission code sequences are not limited to the above-described pulse code sequences, and for example a chirp signal in which the frequency continuously changes in a transmission time period Tw may be used. As the chirp signal, the same chirp signal may be used in one transmission period, or different chirp signals may be used. In the case where the same chirp signal is used as the transmission code sequences, a code sequence storage for storing one chirp signal may be disposed in the code sequence storage 200 shown in FIG. 1. In the case where a plurality of chirp signals are used as the transmission code sequences, code sequence storages the number of which is equal to that of the kinds of the chirp signals may be disposed in the code sequence storage 200 shown in FIG. 1.

When N=4, M=16,
the first code sequence An is (A1, A2, A3, A4 to A16),
the second code sequence Bn is (B1, B2, B3, B4 to B16),
the third code sequence Cn is (C1, C2, C3, C4 to C16), and
the fourth code sequence Dn is (D1, D2, D3, D4 to D16).
The transmission code sequences may be correlative or non-correlative. When the transmission code sequences are non-correlative, it is possible to further suppress interference among transmission pulses which will be described later.

In the case where, when N=4, M=16, the transmission code sequences are complementary code sequences,
the first code sequence (An, Bn) is (A1, B1, A2, B2 to A8, B8),
the second code sequence (Cn, Dn) is (C1, D1, C2, D2 to C8, D8),
the third code sequence (En, Fn) is (E1, F1, E2, F2 to E8, F8), and
the fourth code sequence (Gn, Hn) is (G1, H1, G2, H2 to G8, H8).
(An, Bn), (Cn, Dn), (En, Fn), and (Gn, Hn) are mutually complementary code sequences. The sequences An, Cn, En, and Gn, and the sequences Bn, Dn, Fn, and Hn may be correlative or non-correlative. When the sequences are non-correlative, it is possible to further suppress interference among transmission pulses which will be described later.

For the sake of simplicity of description, in the following, it is assumed that N=4, M=16,
the first code sequence (An, Bn) to be stored in the first code sequence storage 201 is (A, B, A, B, A, B, A, B),
the second code sequence (Cn, Dn) to be stored in the second code sequence storage 202 is (C, D, C, D, C, D, C, D),
the third code sequence (En, Fn) to be stored in the third code sequence storage 203 (not shown) is (E, F, E, F, E, F, E, F), and
the N(=4)-th code sequence (Gn, Hn) to be stored in the N(=4)-th code sequence storage 20N(=4) is (G, H, G, H, G, H, G, H).

In all the transmission code sequences (An, Bn, Cn, Dn, En, Fn, Gn, Hn), namely, the same transmission code sequence (A, B, C, D, E, F, G, H) is used irrespective of the transmission period of the transmission pulse.

As the transmission code sequences (A, B, C, D, E, F, G, H), furthermore,
the transmission code A=[−1, −1, −1, 1],
the transmission code B=[−1, −1, 1, −1],
the transmission code C=[−1, 1, 1, 1],
the transmission code D=[1, 1, −1, 1],
the transmission code E=[1, −1, −1, −1],
the transmission code F=[−1, 1, −1, −1],
the transmission code G=[1, 1, 1, −1], and
the transmission code H=[1, −1, 1, 1]
are used. Namely, the transmission code A and the transmission code B, the transmission code C and the transmission code D, the transmission code E and the transmission code F, and the transmission code G and the transmission code H are complementary codes.

Figure 2:
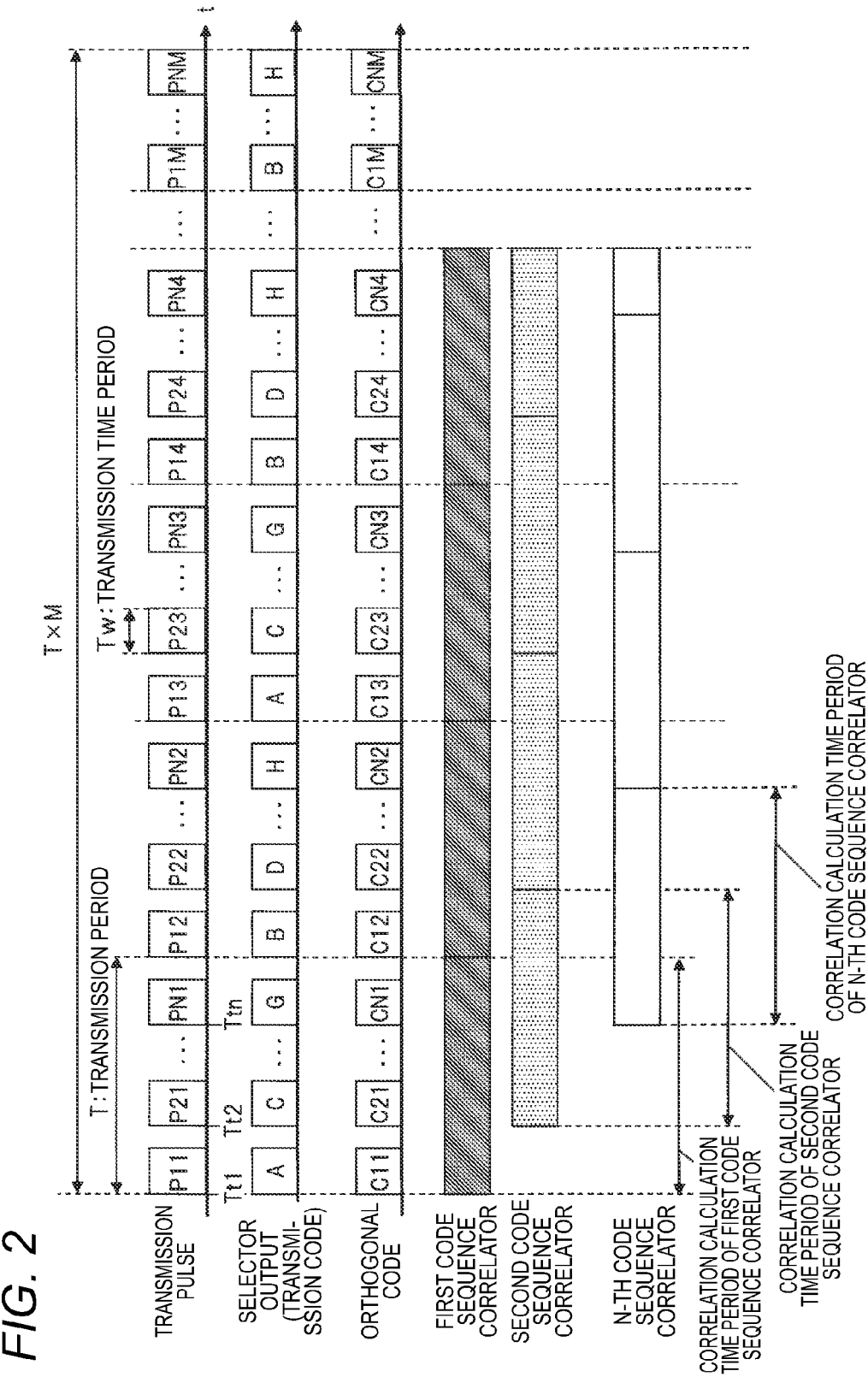
FIG. 2 is a view showing a transmission pulse in each transmission period, selector output, orthogonal code, and correlation calculation time periods of a first code sequence correlator to an N-th code sequence correlator in the radar apparatus of the first embodiment.

The selector 210 selects, within one transmission period, N transmission codes from the transmission code sequences stored in the first code sequence storage 201 to the N-th code sequence storage 20N, in accordance with a predetermined sequence, and sequentially outputs the N transmission codes to the orthogonal code multiplier 230 (see FIG. 2). FIG. 2 is a view showing a transmission pulse in each transmission period, selector output, orthogonal code, and correlation calculation time periods of the first code sequence storage to the N-th code sequence correlator in the radar apparatus 100 of the first embodiment.

In the leftmost (first) transmission period shown in FIG. 2, for example, the selector 210 performs selections in the sequence of the transmission code sequence A of the first code sequence storage 201, and the transmission code sequence C of the second code sequence storage 202 to the transmission code sequence G of the N-th code sequence storage 20N. In the second transmission period, similarly, the selector 210 performs selections in the sequence of the transmission code sequence B of the first code sequence storage 201, and the transmission code sequences D of the second code sequence storage 202 to the transmission code sequence H of the N-th code sequence storage 20N.

In the case where the transmission code sequences are complementary code sequences, in the third and subsequent transmission periods shown in FIG. 2, the selector 210 similarly repeatedly selects the sets of the transmission code sequences selected in the first and second transmission periods, and outputs the selected transmission code sequences to the orthogonal code multiplier 230.

The orthogonal code storage 220 stores orthogonal code sequences (C11 to CNM) containing (N×M) orthogonal codes. CNM is an orthogonal code which, in an M-th transmission period, is multiplied with the N-th transmission code sequence selected by the selector 210. The orthogonal code sequences (C11 to CNM) are code sequences which are disposed for suppressing interference among transmission pulses in the case where the radar apparatus 100 sequentially transmits N transmission pulses in one transmission period.

The orthogonal code multiplier 230 sequentially produces N transmission pulses by, in one transmission period, performing a process of multiplying the N transmission codes which are sequentially selected by the selector 210, with N orthogonal codes which are read out from the orthogonal code storage 220, and outputs N transmission pulses to the DAC 240 and the code sequence correlator 330.

For example, the orthogonal code multiplier 230 sequentially reads out, in the first transmission period shown in FIG. 2, the orthogonal codes C11, C21 to CN1 from the orthogonal code storage 220. The orthogonal code multiplier 230 multiples the first selector output (transmission code A) with the orthogonal code C11 to produce a transmission pulse P11, and multiples the second selector output (transmission code C) with the orthogonal code C21 to produce a transmission pulse P21. The orthogonal code multiplier 230 similarly repeats the multiplying process to multiply the N-th selector output (transmission code G) with the orthogonal code CN1 to produce a transmission pulse PN1.

Figure 3:
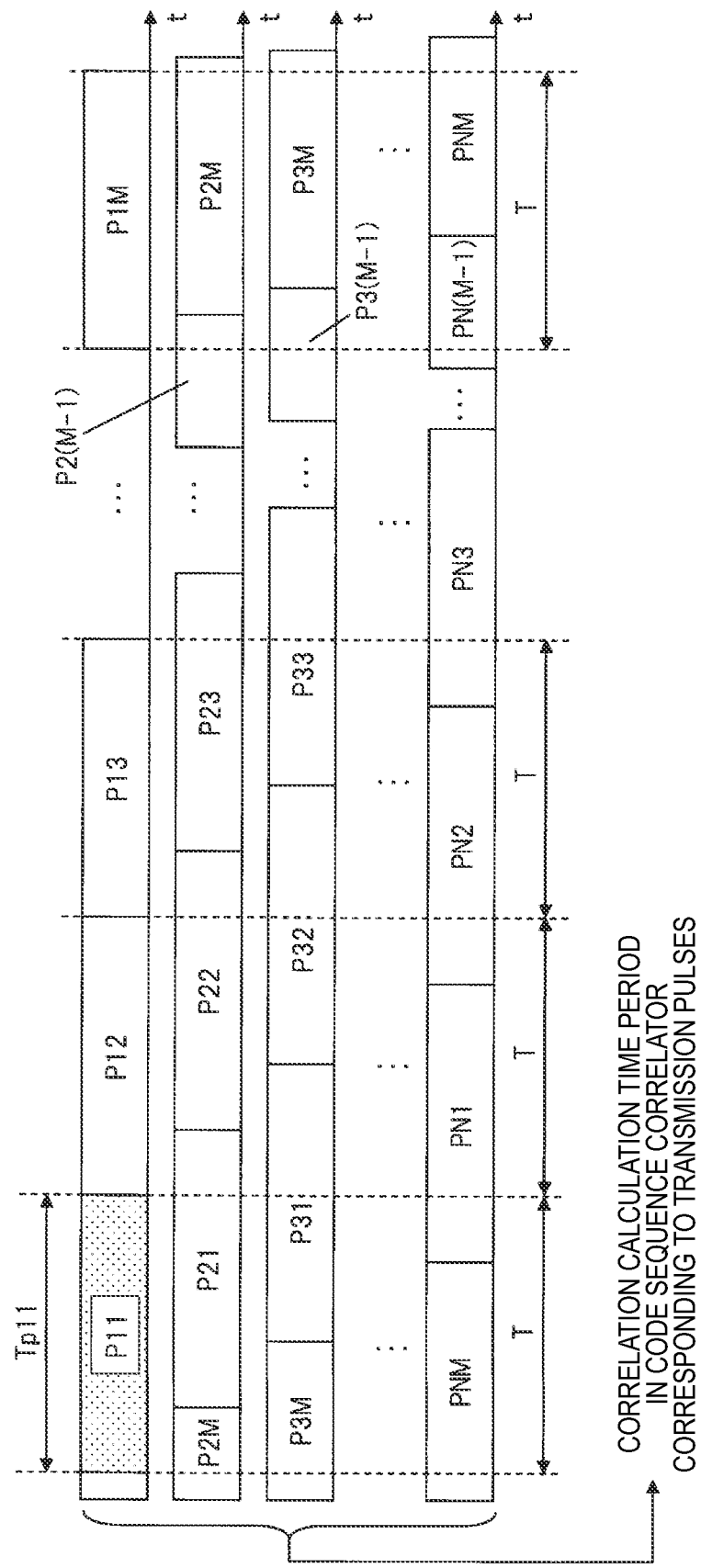
FIG. 3 is a diagram illustrating transmission pulses which may possibly interfere with, for example, a transmission pulse using a first code sequence.

Here, the (N×M) orthogonal code sequences (C11 to CNM) which are used in the radar apparatus 100 of the embodiment will be described with reference to FIG. 3. FIG. 3 is a diagram illustrating transmission pulses which may possibly interfere with, for example, a transmission pulse using the first code sequence.

For example, the transmission pulse P11 which is first transmitted in the first transmission period shown in FIG. 3 will be considered. Transmission pulses which may possibly interfere with the transmission pulse P11 are transmission pulses received in a correlation calculation time period Tp11 of the first code sequence correlator 331 in which the code of the transmission pulse P11 is used as a correlation coefficient that will be described later. Namely, transmission pulses which are used as correlation coefficients by a code sequence correlator having a correlation calculation time period that partly overlaps the correlation calculation time period Tp11 of the first code sequence correlator 331 may possibly interfere with the transmission pulse P11.

Specifically, transmission pulses which may possibly interfere with the transmission pulse P11 are in total (2N−1) (=1+2(N−1)) transmission pulses or the transmission pulse P11 itself, transmission pulses P21, P31 to PN1 which are transmitted after the transmission of the transmission pulse P11, and transmission pulses P2M, P3M to PNM which are transmitted before the transmission of the transmission pulse P11.

In order to suppress interference among the transmission pulses P11, P12 to P1M in which, in each of M transmission periods T, the first code sequence transmitted at a transmission timing Tt1 is used, and the transmission pulses P21, P22 to P2M in which the second code sequence transmitted at a transmission timing Tt2 of the same transmission period T is used, therefore, Exp. (1) in which the inner product is zero holds with respect to an orthogonal code.

[Exp. 1]

$$C11 \cdot C21 + C12 \cdot C22 + C13 \cdot C23 + \sim + C1M \cdot C2M = 0 \qquad (1)$$

In order to suppress interference among the transmission pulses P11. P12 to P1M in which, for every M transmission periods T, the first code sequence transmitted at a transmission timing Tt1 is used, and the transmission pulses P31, P32 to P3M in which the third code sequence transmitted at a transmission timing Tt3 of the same transmission period T is used, moreover, Exp. (2) in which the inner product is zero holds with respect to an orthogonal code.

[Exp. 2]

$$C11 \cdot C31 + C12 \cdot C32 + C13 \cdot C33 + \sim + C1M \cdot C3M = 0 \qquad (2)$$

In order to suppress interference among the transmission pulses P11, P12 to P1M in which, for every M transmission periods T, the first code sequence transmitted at the transmission timing Tt1 is used, and the transmission pulses PN1, PN2 to PNM in which the N-th code sequence transmitted at a transmission timing Tt of the same transmission period T is used, similarly, Exp. (3) in which the inner product is zero holds with respect to an orthogonal code.

[Exp. 3]

$$C11 \cdot CN1 + C12 \cdot CN2 + C13 \cdot CN3 + \sim + C1M \cdot CNM = 0 \qquad (3)$$

In order to suppress interference among the transmission pulses P11, P12 to P1M in which, for every M transmission periods T, the first code sequence transmitted at the transmission timing Tt1 is used, and the transmission pulses P2M, P21 to P2(M−1) in which, in the previous transmission period T, the second code sequence transmitted at a transmission timing Tt2 is used, moreover, Exp. (4) in which the inner product is zero holds with respect to an orthogonal code.

[Exp. 4]

$$C11 \cdot C2M + C12 \cdot C21 + C13 \cdot C22 + \sim + C1M \cdot C2(M-1) = 0 \qquad (4)$$

In order to suppress interference among the transmission pulses P11, P12 to P1M in which, for every M transmission periods T, the first code sequence transmitted at the transmission timing Tt1 is used, and the transmission pulses P3M, P31 to P3(M−1) in which, in the previous transmission period T, the third code sequence transmitted at a transmission timing Tt3 is used, furthermore, Exp. (5) in which the inner product is zero holds with respect to an orthogonal code.

[Exp. 5]

$$C11 \cdot C3M + C12 \cdot C31 + C13 \cdot C32 + \sim + C1M \cdot C3(M-1) = 0 \qquad (5)$$

In order to suppress interference among the transmission pulses P11, P12 to P1M in which, for every M transmission periods T, the first code sequence transmitted at the transmission timing Tt1 is used, and the transmission pulses PNM, PN1 to PN(M−1) in which, in the previous transmission period T, the N-th code sequence transmitted at a transmission timing Ttn is used, similarly, Exp. (6) in which the inner product is zero holds with respect to an orthogonal code.

[Exp. 6]

$$C11 \cdot CNM + C12 \cdot CN1 + C13 \cdot CN2 + \sim + C1M \cdot CN(M-1) = 0 \qquad (6)$$

In order to allow the transmission pulses P11, P12 to P1M in which, for every M transmission periods T, the first code sequence transmitted at the transmission timing Tt1 is used, to produce an autocorrelation peak with respect to the own transmission pulses P11, P12 to P1M, Exp. (7) holds with respect to an orthogonal code.

[Exp. 7]

$$C11 \cdot C11 + C12 \cdot C12 + C13 \cdot C13 + \sim + C1M \cdot C1M = M \qquad (7)$$

Exp. (1) to Exp. (7) are relational expressions of orthogonal codes for suppressing interference with respect to the transmission pulses P11, P12 to P1M in which the first code sequence is used, and a relational expression of orthogonal codes for allowing the transmission pulses P11, P12 to P1M in which the first code sequence is used, to produce an autocorrelation peak with respect to the own transmission pulses P11, P12 to P1M.

Similarly, relational expressions of orthogonal codes for suppressing interference with respect to the transmission pulses in which the second code sequence to the N-th code sequence are used, relational expressions with respect to orthogonal codes for allowing an autocorrelation peak to be produces hold. With respect to the (N×M) orthogonal code sequences (C11 to CNM), therefore, Exp. (8) holds.

[Exp. 8]

$$\begin{pmatrix} C11 & C12 & C13 & \ldots & C1M \\ C21 & C22 & C23 & \ldots & C2M \\ C31 & C32 & C33 & \ldots & C3M \\ \vdots & \vdots & \vdots & \ddots & \vdots \\ CN1 & CN2 & CN3 & \ldots & CNM \end{pmatrix}$$

$$\begin{pmatrix} C11 & C21 & C31 & \ldots & CN1 & C1M & C2M & C3M & \ldots & CNM \\ C12 & C22 & C32 & \ldots & CN2 & C11 & C21 & C31 & \ldots & CN1 \\ C13 & C23 & C33 & \ldots & CN3 & C12 & C22 & C32 & \ldots & CN2 \\ \vdots & \vdots & \vdots & \ddots & \vdots & \vdots & \vdots & \vdots & \ddots & \vdots \\ C1M & C2M & C3M & \ldots & CNM & C1M-1 & C2M-1 & C3M-1 & \ldots & CNM-1 \end{pmatrix} =$$

$$\begin{pmatrix} M & 0 & 0 & \ldots & 0 & * & 0 & 0 & \ldots & 0 \\ 0 & M & 0 & \ldots & 0 & 0 & * & 0 & \ldots & 0 \\ 0 & 0 & M & \ldots & 0 & 0 & 0 & * & \ldots & 0 \\ \vdots & \vdots & \vdots & \ddots & \vdots & \vdots & \vdots & \vdots & \ddots & \vdots \\ 0 & 0 & 0 & \ldots & M & 0 & 0 & 0 & \ldots & * \end{pmatrix}$$

(8)

The left side of Exp. (8) is a multiplication of an N-row by M-column matrix of the (N×M) orthogonal code sequences (C11 to CNM), and an M-row by 2N-column matrix. The M-row by 2N-column matrix is a matrix which is obtained by combining an M-row by N-column matrix in which an N-row by M-column matrix is transposed, with a matrix in which the elements of the M-th row of the transposed M-row by N-column matrix are shifted to the 1-st row.

The right side of Exp. (8) is an M-row by 2M-column matrix in which two M-row by M-column diagonal matrixes are combined with each other.

In Exp. (8), the orthogonal codes of the orthogonal code sequences (C11 to CNM) are +1 or −1. However, they are not limited to +1 or −1 as far as Exp. (8) is satisfied.

In the following embodiments, moreover, it is assumed that the time period from the transmission timing of the transmission pulse to the reception timing of the reception pulse does not exceed the transmission period T. With respect to C11 and C12, and C1M and C11, for example, it is not required to consider mutual orthogonality. In Exp. (8), therefore, * (asterisk) may be an arbitrary number.

This is because, even in the case where the time period from the transmission timing of the transmission pulse to the reception timing of the reception pulse exceeds the transmission period T, the signal level of the reception pulse is low, and therefore it is not required not to consider orthogonality.

As a result of calculation relating to an element which is * (asterisk) in Exp. (8), for example, a calculation result relating to * of the 1-st row and the (m+1)-th column is indicated by Exp. (9).

[Exp. 9]

$$C11 \cdot C1M + C12 \cdot C11 + C13 \cdot C12 + \ldots + C1M \cdot C1(M-1) = * \quad (9)$$

Each term in the left side of Exp. (9) is a calculation of a transmission pulse (for example, P11 corresponding to C11) in which an X-th (X: one of 1 to N) transmission code sequence is used, and a transmission pulse (for example, P1M corresponding to C1M) in which the X-th transmission code sequence in the previous transmission period T is used. In these, orthogonality is not considered because of the above-mentioned reason.

In the case where * (asterisk) is 0, even when the time period from the transmission timing of the transmission pulse to the reception timing exceeds the transmission period, the transmission pulse in which the X-th transmission code sequence is used, and the X-th transmission code sequence in the previous transmission period can be made orthogonal to each other. It is not necessary to use the transmission period T of a sufficient length. Therefore, the transmission period T can be made short.

When N=4 and M=16, for example, the orthogonal code sequences (C11 to CNM) are
C1 (m)=[1, −1, −1, 1, −1−1, 1, −1, 1, −1, 1, −1, −1],
C2 (m)=[1, −1, −1, 1, −1, −1 1, 1, −1, −1, 1, −1, −1],
C3 (m)=[1, 1, 1, 1, −1, −1, −1, −1, 1, 1, 1, 1, −1, −1, −1, −1],
C4 (m)=[1, 1, 1, 1, 1, 1, 1, 1, −1, −1, −1, −1, −1, −1, −1, −1], When N=4 and M=16, therefore, the orthogonal code multiplier 230 calculates the codes of the transmission pulses P11, P116 as follows.
Transmission pulse P11=first code sequence A●orthogonal code C11 =[−1, −1, −1, 1]●[1]=[−1, −1, −1, 1],
transmission pulse P21=second code sequence C●orthogonal code C21 =[−1, 1, 1, 1]●[1]=[−1, 1, 1, 1],
transmission pulse P31=third code sequence E●orthogonal code C31 =[1, −1, −1, −1]●[1]=[1, −1, −1, −1],
transmission pulse P41=fourth code sequence G●orthogonal code C41 =[1, 1, 1, −1]●[1]=[1, 1, 1, −1],
transmission pulse P12=first code sequence B●orthogonal code C12 =[−, 1, −1]●[−1]=[1, 1, −1, 1]
transmission pulse P22=second code sequence D●orthogonal code C22 =[1, 1, −1, 1]●[1]=[1, 1, −1, 1],
transmission pulse P32=third code sequence F●orthogonal code C32 =[−1, 1, −1, −1]●[1]=[−1, 1, −1, −1],
transmission pulse P42=fourth code sequence H●orthogonal code C42 =[1, −1, 1, 1]●[1]=[1, −1, 1, 1],
transmission pulse P13=first code sequence A●orthogonal code C13 =[−1, −1, −1, 1]●[1]=[−1, −1, −1, 1],
transmission pulse P23=second code sequence C●orthogonal code C23 =[−1, 1, 1, 1]●[−1]=[1, −1, −1, −1],
transmission pulse P33=third code sequence E orthogonal code C33 =[1, −1, −1, −1]●[1]=[1, −1, −1, −1],
transmission pulse P43=fourth code sequence G●orthogonal code C43 =[1, 1, 1, −1]●[1]=[1, 1, 1, −1],
. . . ,
transmission pulse P116=first code sequence B●orthogonal code C116 =[−1, −1, 1, −1]●[−1]=[−1, 1, −1, 1],
transmission pulse P216=second code sequence D●orthogonal code C216 =[1, 1, −1, 1]●[−1]=[−1, −1, 1, −1]
transmission pulse P316=third code sequence F●orthogonal code C316 =[−1, 1, −1, −1]●[−1]=[1, −1, 1, 1],
transmission pulse P416=fourth code sequence H●orthogonal code C416 =[1, −1, 1, 1]●[−1]=[−1, 1, −1, −1].

The DAC 240 D/A-converts the digital transmission pulses which have been subjected to the multiplication process by the orthogonal code multiplier 230, to analog transmission pulses, and outputs the analog transmission pulses to the radio transmitter 250.

The radio transmitter 250 converts the analog transmission pulses which have been D/A-converted by the DAC 240, to high-frequency signals by using a local oscillation signal (local signal) which is produced by a local oscillation signal oscillator that is not shown. The radio transmitter 250 transmits N high-frequency signals through the transmission antenna 260, in one transmission period T. The transmission time period Tw of the N transmission pulses which are transmitted in each transmission period T does not temporally overlap adjacent transmission pulses, and is constant, and moreover the interval (Tt2−Tt1) of transmission timings of transmission pulses may be equal to each other or may not be equal to each other (see FIG. 2).

The radio receiver 310 receives through the reception antenna 300 N transmission pulses which are obtained by reflecting the N transmission pulses transmitted in one transmission period T, from the target. The radio receiver 310 converts the high-frequency signals received through the reception antenna 300, to baseband reception pulses by using a local oscillation signal (local signal) which is produced by a local oscillation signal oscillator that is not shown, and outputs the reception pulses to the ADC 320. Hereinafter, also the received high-frequency signals are referred to as the reception pulses.

The ADC 320 A/D converts the analog baseband reception pulses to digital baseband reception pulses, and outputs the digital baseband reception pulses to the code sequence correlator 330. Namely, the digital baseband reception pulses are input to the first code sequence correlator 331 to the N-th code sequence correlator 33N. Also the codes of the transmission pulses which have been subjected to the multiplication process by the orthogonal code multiplier 230 are input to the first code sequence correlator 331 to the N-th code sequence correlator 33N.

The first code sequence correlator 331 to the N-th code sequence correlator 33N operate in a similar manner. Hereinafter, for example, the operation of the first code sequence correlator 331 will be therefore mainly described, and, with respect to the operations of the second code sequence correlator 332 to the N-th code sequence correlator 33N, the description of the same contents as the operation of the first code sequence correlator 331 will be omitted or simplified, and different contents will be described.

In the first transmission period shown in FIG. 2, the first code sequence correlator 331 calculates correlation values between the N transmission pulses P11 to PN1 that are transmitted during a period from the transmission timing of the transmission pulse P11 in which the first code sequence A or B is used, to a timing when the duration of the transmission period T elapses, and the N reception pulses that are input during the period from the transmission timing of the transmission pulse P11 to the timing when the duration of the transmission period T elapses (see FIG. 2).

Namely, the first code sequence correlator 331 performs the correlation calculation while using the time period from the transmission timing of the transmission pulse P11 in which the first code sequence A or B is used, to the timing when the duration of the transmission period T elapses, as the correlation calculation time period (see the hatched portion shown in FIG. 2). Also in the second and subsequent transmission periods shown in FIG. 2, the first code sequence correlator 331 similarly performs the correlation calculation while using the time period from the transmission timing of the transmission pulse in which the first code sequence A or B is used, to the timing when the duration of the transmission period T elapses, as the correlation calculation time period (see the hatched portion shown in FIG. 2).

Figure 4:
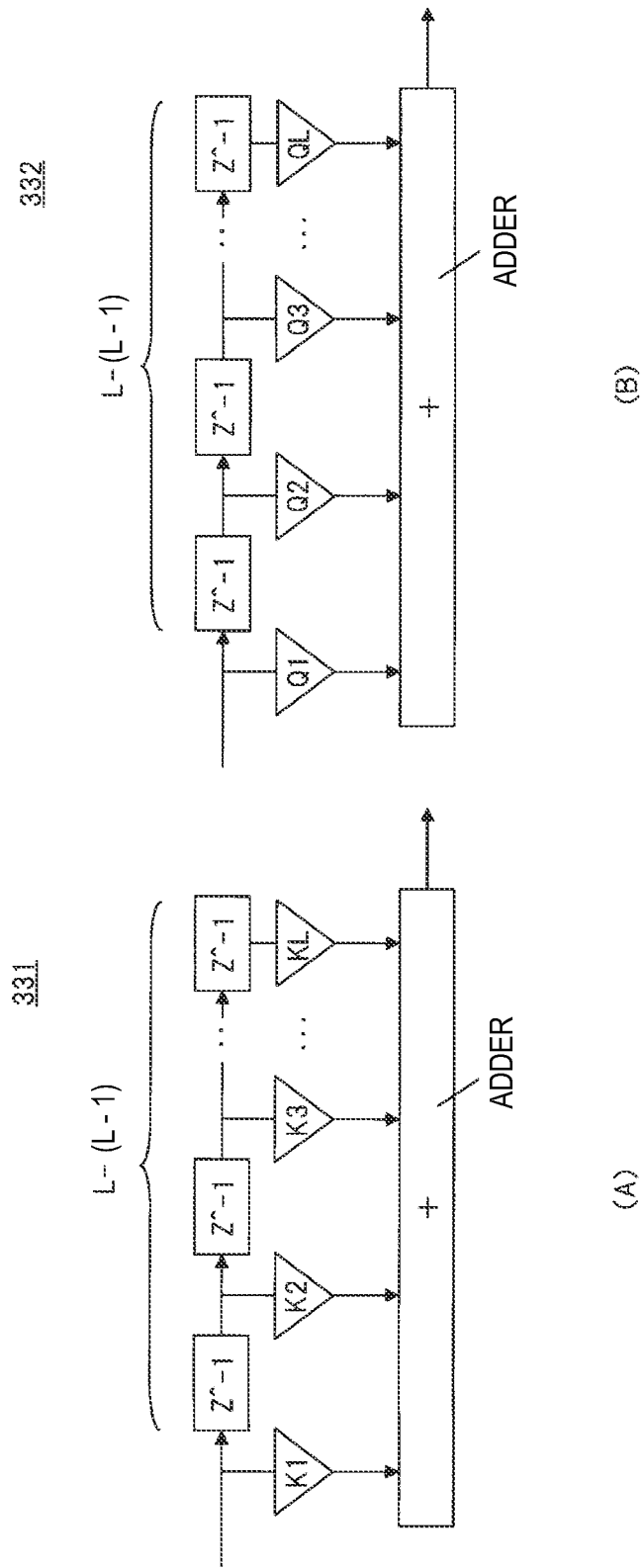
FIG. 4 (A) is a configuration diagram of the first code sequence correlator in the radar apparatus of the first embodiment, and FIG. 4 (B) is a configuration diagram of the second code sequence correlator in the radar apparatus of the first embodiment.

FIG. 4(A) is a configuration diagram of the first code sequence correlator 331 in the radar apparatus 100 of the first embodiment. FIG. 4(B) is a configuration diagram of the second code sequence correlator 332 in the radar apparatus 100 of the first embodiment. Each of the code sequence correlators shown in FIGS. 4(A) and 4(B) can be configured by, for example, using an FIR (Finite Impulse Response) filter.

The first code sequence correlator 331 shown in FIG. 4(A) includes L correlation coefficient holders K1, K2 to KL, (L−1) delaying devices ($z^{-1}$), and an adder. The first code sequence correlator 332 shown in FIG. 4(B) includes L correlation coefficient holders Q1, Q2 to QL, (L−1) delaying devices ($z^{-1}$), and an adder. L is an integer of a power of 2, and indicates the code length of a transmission pulse.

When, for example, the first correlation calculation time period is started, the first code sequence correlator 331 sets codes of a transmission pulse in which the first code sequence A or B is used, as L correlation coefficients (tap coefficients) K1, K2, K3 to KL shown in FIG. 4(A), and holds the correlation coefficients K1 to KL during the correlation calculation time period. When the second correlation calculation time period is started, the first code sequence correlator 331 deletes the correlation coefficients in the previous or first correlation calculation time period, and sets codes of a transmission pulse in which the first code sequence A or B is used, in the second correlation calculation time period, as the correlation coefficients K1 to KL shown in FIG. 4(A).

In the correlation calculation time periods shown in FIG. 2 (see the hatched portion shown in FIG. 2), namely, the first code sequence correlator 331 calculates the sliding correlation values of the N input reception pulses while using the codes of the transmission pulse in which the first code sequence A or B is used, as correlation coefficients, and outputs the calculated value to the coherent adder 340.

In the correlation calculation time periods shown in FIG. 2 (see the dot pattern portion shown in FIG. 2), moreover, the second code sequence correlator 332 calculates the sliding correlation values of the N input reception pulses while using the codes of the transmission pulse in which the second code sequence C or D is used, as correlation coefficients, and outputs the calculated value to the coherent adder 340.

In the correlation calculation time periods shown in FIG. 2 (see the white pattern portion shown in FIG. 2), similarly, the N-th code sequence correlator 33N calculates the sliding correlation values of the N input reception pulses while using the codes of the transmission pulse in which the N-th code sequence G or H is used, as correlation coefficients, and outputs the calculated value to the coherent adder 340.

In the first code sequence correlator 331, the correlation calculation time period may not be started at the transmission timing Tt1 of the transmission pulse P11, and the correlation calculation time period may be started, for example, after elapse of a predetermined time period from the transmission timing Tt1 of the transmission pulse P11. The end timing of the correlation calculation time period is not changed.

There is a case where, at the transmission timing Tt1 of the transmission pulse P11, for example, the radar apparatus 100 does not receive the transmission pulse which is obtained by reflecting the transmission pulse P11 from the target. Therefore, in the case where a situation where the distance between the radar apparatus 100 and the target is closest is considered, for example, the first code sequence correlator 331 may set the correlation calculation time period while delaying the start timing of the correlation calculation time period by the time period required for the transmission pulse to travel the close distance between the radar apparatus 100 and the target.

This allows the first code sequence correlator 331 to shorten the correlation calculation time period, and therefore the power consumption for the correlation calculation can be reduced. Also in the other correlators or the second code sequence correlator 332 to the N-th code sequence correlator 33N, the correlation calculation time period may be started after elapse of a similar predetermined time period. The end timings of the correlation calculation time periods are not changed.

Figure 5:
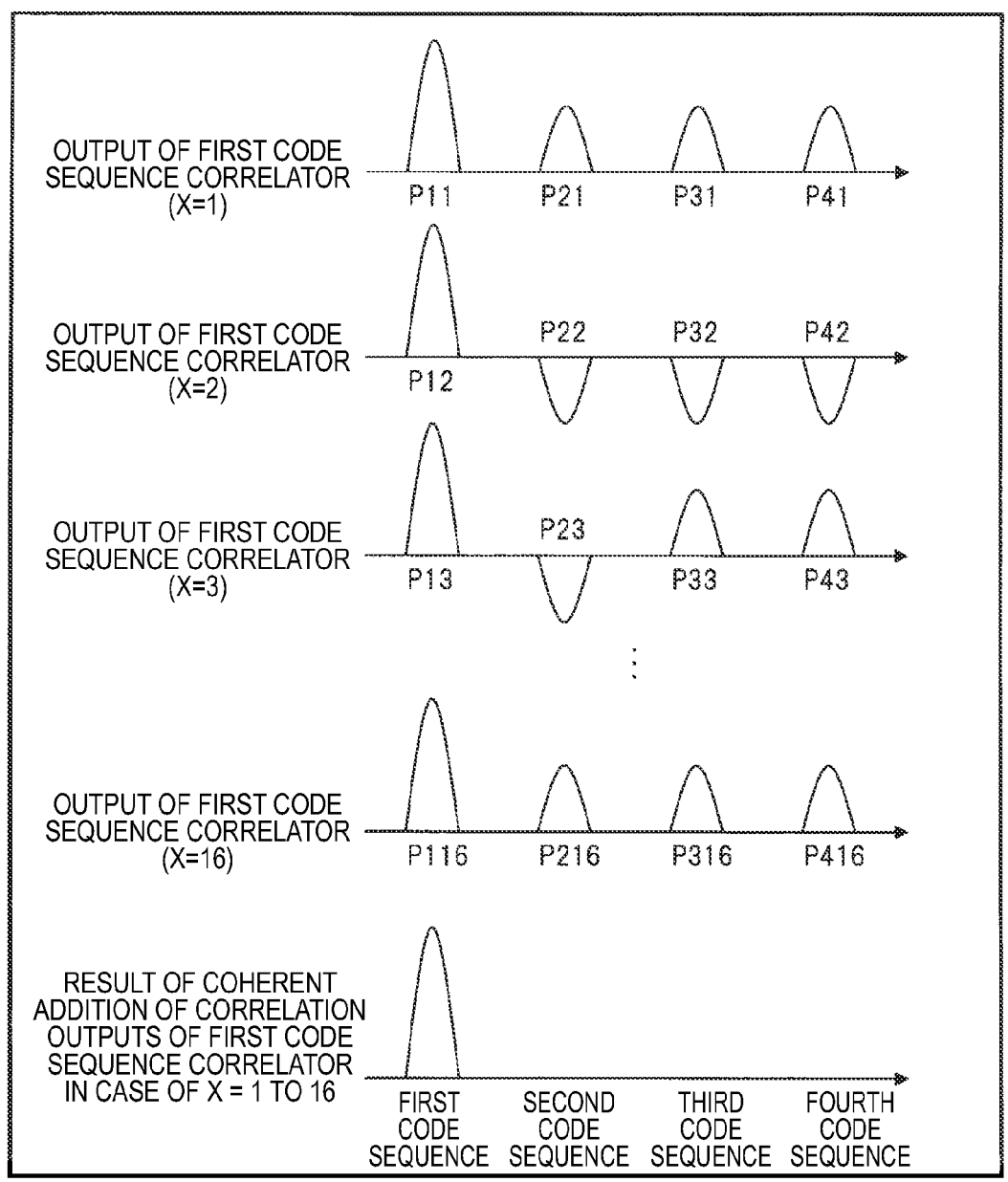
FIG. 5 is a diagram illustrating outputs of the first code sequence correlator in, for example, 16 transmission periods, and a result of coherent addition.

The sliding correlation values which are calculated by the first code sequence correlator 331 to the N-th code sequence correlator 33N in M transmission periods are input to the coherent adder 340. FIG. 5 is a diagram illustrating outputs of the first code sequence correlator 331 in, for example, 16 transmission periods, and a result of coherent addition. In FIG. 5, sliding correlation values in the case where one target exists are shown.

In the sliding correlation values which are correlation outputs of the first code sequence correlator 331, for example, the sliding correlation value between the transmission pulse 11 in the first transmission period and the reception pulse in which the transmission pulse P11 reflected from the target is received appears as a peak.

In the sliding correlation values which are correlation outputs of the first code sequence correlator 331, moreover, the sliding correlation value between the transmission pulse 12 in the second transmission period and the reception pulse in which the transmission pulse P12 reflected from the target is received appears as a peak.

In the sliding correlation values which are correlation outputs of the first code sequence correlator 331, furthermore, the sliding correlation value between the transmission pulse 13 in the third transmission period and the reception pulse in which the transmission pulse P13 reflected from the target is received appears as a peak.

In the sliding correlation values which are correlation outputs of the first code sequence correlator 331, similarly, the sliding correlation value between the transmission pulse 116 in the sixteenth transmission period and the reception pulse in which the transmission pulse P116 reflected from the target is received appears as a peak.

The sliding correlation values which are input to the coherent adder 340 are different in correlation calculation time periods of the sliding correlation values of the first code sequence correlator 331 to the N-th code sequence correlator 33N. Therefore, timings when peaks of M (=16) sliding correlation values of the first code sequence correlator 331 to the N-th code sequence correlator 33N occur are shifted from one another.

In accordance with the first code sequence correlator 331 to the N-th code sequence correlator 33N, consequently, the coherent adder 340 matches the start timings of the correlation calculation time periods of the N input sliding correlation values with one another by using, for example, (N−1) delaying devices, and adds together the sliding correlation values which are calculated for the M transmission periods (see FIG. 5).

In the coherent adder 340, as a result of the addition of the sliding correlation values which are calculated over the M transmission periods by, for example, the first code sequence correlator 331, therefore, a peak is obtained in a result of coherent addition of sliding correlation values between transmission pulses in which the first code sequence A or B is used, and reception pulses which are obtained by receiving transmission pulses that are obtained by reflecting the transmission pulses from the target. The coherent adder 340 calculates the distance between the radar apparatus 100 and the target based on the peak of the result of coherent addition of sliding correlation values.

In the coherent adder 340, as a result of the addition of the sliding correlation values which are calculated over the M transmission periods by, for example, the first code sequence correlator 331, moreover, sliding correlation values between transmission pulses in which the other code sequences (the second code sequence to the N-th code sequence) other than the first code sequence A or B are used, and reception pulses that are obtained by receiving transmission pulses that are obtained by reflecting the above-mentioned transmission pulses from the target, i.e., an interference wave that interferes with the transmission pulses in which the first code sequence is used can be canceled or suppressed (see FIG. 5). Furthermore, similar effects are achieved from the result of coherent addition with respect to the correlation outputs of the other code sequence correlators.

From the above, the radar apparatus 100 of the embodiment transmits, in one transmission period, performs a process of multiplying the N different transmission codes with the N orthogonal codes, transmits the N transmission pulses, and, over the M transmission periods, repeats transmission of (N×M) transmission pulses. The radar apparatus 100 calculates sliding correlation values between the N transmitted transmission pulses, and the reception pulses which are obtained by receiving transmission pulses that are reflected from the target, over the M transmission periods to perform coherent addition.

Therefore, the radar apparatus 100 can transmit a plurality or N different transmission pulses in one transmission period by using the single DAC 240 and the radio transmitter 250 to which the transmission antenna 260 is connected, and hence it is not necessary to, for the purpose of transmission of transmission pulses, dispose N sets of the DAC 240 and the radio transmitter 250 to which the transmission antenna 260 is connected. Consequently, the configuration of the transmission circuit can be simplified, the circuit scale can be reduced, and the production cost can be lowered.

In the radar apparatus 100, by a result of the coherent addition of the sliding correlation values which are calculated over the M transmission periods by the first code sequence correlator 331 to the N-th code sequence correlator 33N, moreover, a peak is obtained in a result of coherent addition of sliding correlation values between transmission pulses and reception pulses which are obtained by receiving transmission pulses that are obtained by reflecting transmission pulse identical with the above-mentioned transmission pulses, from the target.

In the radar apparatus 100, furthermore, sliding correlation values with respect to reception pulses that are obtained by receiving transmission pulses that are obtained by reflecting the transmission pulses in which transmission code sequences different from the transmission code sequence used for producing transmission pulses are used, from the target, i.e., an interference wave which interferes with the transmission pulses in which the transmission code sequence is used can be canceled or suppressed.

In the radar apparatus 100, by a result of the coherent additions of the sliding correlation values which are calculated over the M transmission periods by the first code sequence correlator 331 to the N-th code sequence correlator 33N, therefore, interferences between different transmission pulses can be suppressed, the gain of coherent addition which is N times that is equal to the number of the code sequences used in production of the transmission pulses is obtained, and an N-fold reception SNR is obtained as a communication characteristic between the radar apparatus 100 and the target.

(Modification of First Embodiment)

The above-described radar apparatus 100 of the first embodiment performs transmission while shifting the transmission zones Tw of the N kinds of transmission pulses in one transmission period T.

In a modification (hereinafter, referred to "the modification") of the first embodiment, by using N transmission systems, i.e., N sets of a DAC and a radio transmitter to which a transmission antenna is connected, one kind of transmission pulse is simultaneously transmitted from the transmission systems in one transmission period T.

Figure 14:
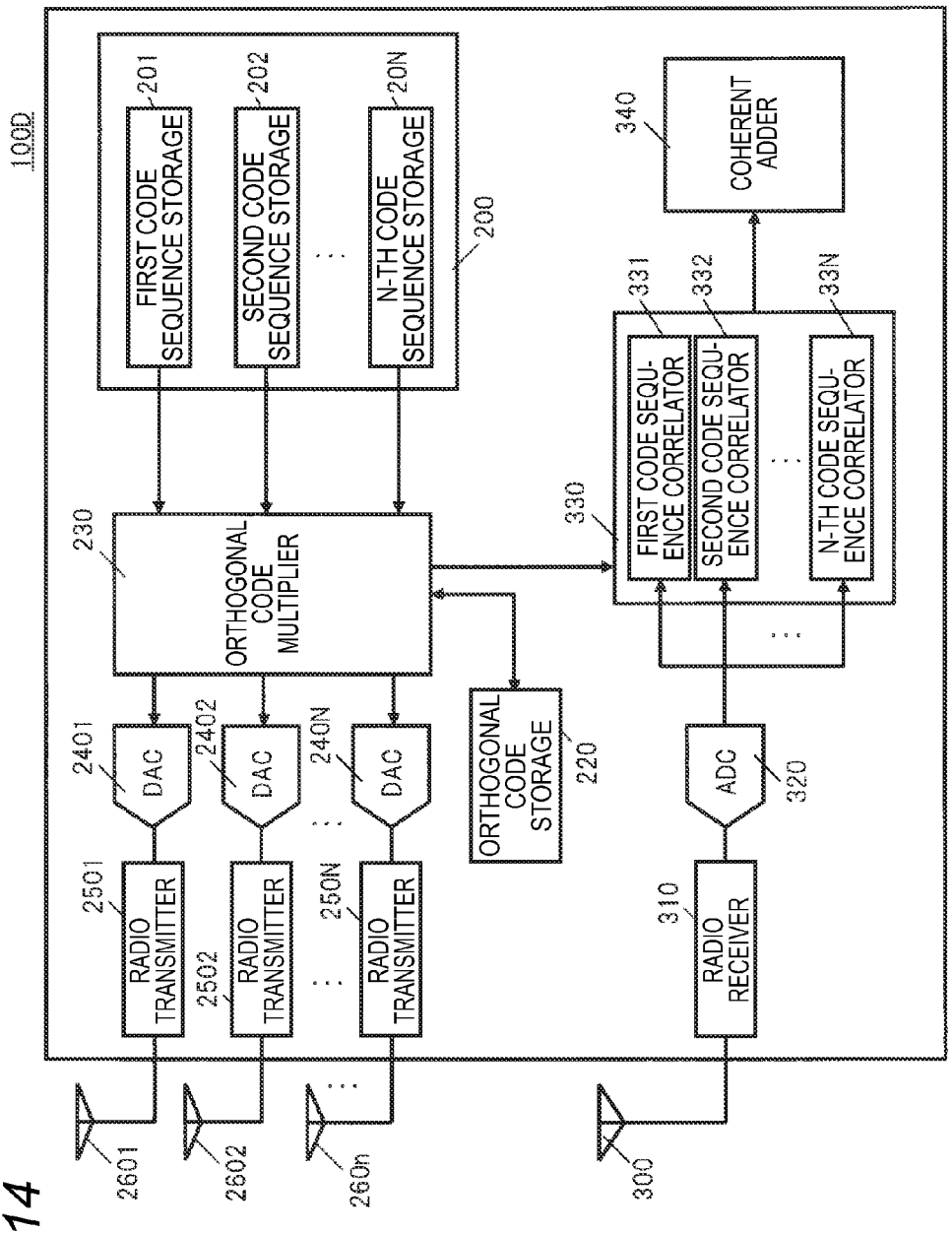
FIG. 14 is a block diagram showing the internal configuration of a radar apparatus of a modification of the first embodiment.
Figure 15:
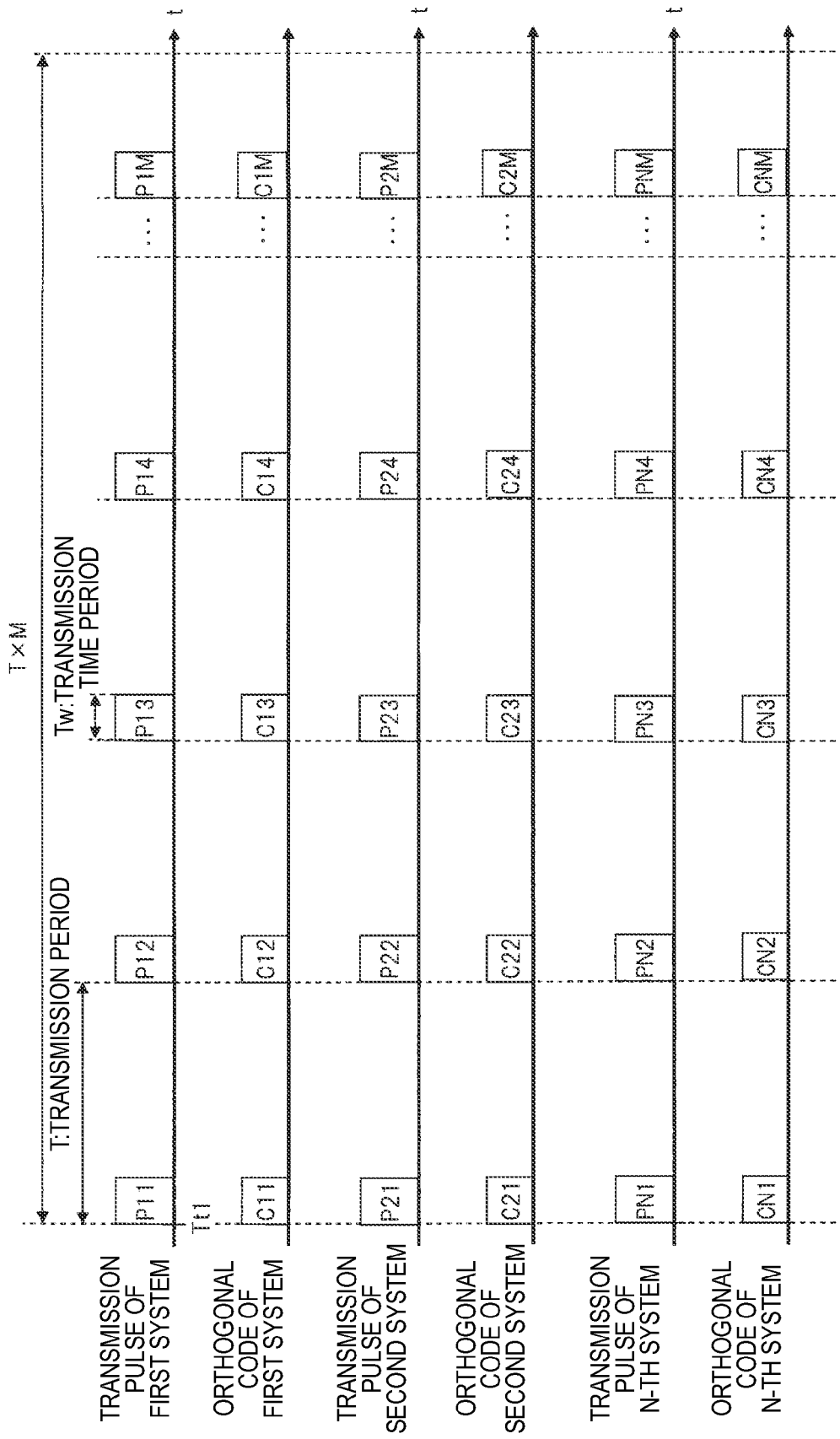
FIG. 15 is a view showing an example of a time chart for transmitting transmission pulses from transmission systems of the radar apparatus of the modification of the first embodiment.

FIG. 14 is a block diagram showing the internal configuration of a radar apparatus 100D of the modification of the first embodiment. FIG. 15 is a view showing an example of a time chart for transmitting transmission pulses from the transmission systems of the radar apparatus of the modification of the first embodiment. In the modification, the description of the same contents as the radar apparatus 100 of the first embodiment will be omitted or simplified, and different contents will be described.

The radar apparatus 100d shown in FIG. 14 includes the code sequence storage 200, the orthogonal code storage 220, the orthogonal code multiplier 230, N DACs 2401 to 240N, radio transmitters (RF transmitters) 2501 to 250N to which N transmission antennas 2601 to 260N are respectively connected, the radio receiver (RF receiver) 310 to which the reception antenna 300 is connected, the ADC 320, the code sequence correlator 330, and the coherent adder 340.

In the radar apparatus 100D of the modification, in one transmission period T, the orthogonal code multiplier 230 superimposes (multiplies) N kinds of orthogonal code C11 to CN1 on N kinds of transmission code sequences which are read out from the code sequence storage 200, thereby producing the N kinds of transmission pulses P11 to PN1. The N kinds of transmission pulses are simultaneously transmitted from N transmission systems. Since the transmission pulses are simultaneously transmitted from the N transmission systems, also the process start timing of the code sequence correlator 330 is at the same time as the transmission of the transmission pulses.

The total or (N×M) orthogonal codes used in the modification are requested that orthogonality be secured in the transmission sequences in which transmission pulses are simultaneously transmitted in one transmission period T. In the first embodiment, in consideration of two transmission periods before and after a specific transmission period, orthogonality of N kinds of transmission pulses is required. In the modification, N kinds of transmission pulses are simultaneously transmitted in one transmission period, and hence it is requested that orthogonality of transmission pulses be secured in one transmission period.

Therefore, conditions (see Exp. (10)) which is satisfied by orthogonal codes in the modification are simplified as compared with the conditions (see Exp. (8)) which is satisfied by orthogonal codes in the above-described first embodiment.

[Exp. 10]

$$\begin{pmatrix} C11 & C12 & C13 & \ldots & C1M \\ C21 & C22 & C23 & \ldots & C2M \\ C31 & C32 & C33 & \ldots & C3M \\ \vdots & \vdots & \vdots & \ddots & \vdots \\ CN1 & CN2 & CN3 & \ldots & CNM \end{pmatrix} \quad (10)$$

$$\begin{pmatrix} C11 & C21 & C31 & \ldots & CN1 \\ C12 & C22 & C32 & \ldots & CN2 \\ C13 & C23 & C33 & \ldots & CN3 \\ \vdots & \vdots & \vdots & \ddots & \vdots \\ C1M & C2M & C3M & \ldots & CNM \end{pmatrix} = \begin{pmatrix} M & 0 & 0 & \ldots & 0 \\ 0 & M & 0 & \ldots & 0 \\ 0 & 0 & M & \ldots & 0 \\ \vdots & \vdots & \vdots & \ddots & \vdots \\ 0 & 0 & 0 & \ldots & M \end{pmatrix}$$

In the modification, one kind of transmission pulse is transmitted in each transmission system in one transmission period T. Therefore, the modification is useful in the case where the transmission time period Tw in one transmission period T is long or one transmission period T is short. In the case where one transmission period T<(M×Tw), it is difficult to use orthogonal codes in the first embodiment.

In the case where a target which exists at a position very close to the radar apparatus is to be subjected the measurement, for example, it is difficult to use orthogonal codes in the first embodiment, and therefore orthogonal codes (see Exp. (10)) in the modification are useful.

In the radar apparatus 100D of the modification, moreover, transmission pulses can be transmitted N times in a constant transmission period T similarly with the radar apparatus 100 of the first embodiment, and therefore a high SNR is obtained.

(Second Embodiment)

In the first embodiment, the number of the code sequence correlator 330 is required to be equal to that of transmission code sequences which are used in the production of N transmission pulses to be transmitted in one transmission period.

In a second embodiment, a radar apparatus 100A will be described in which the configuration of the code sequence correlator 330 in the radar apparatus 100 of the first embodiment is simplified.

Figure 6:
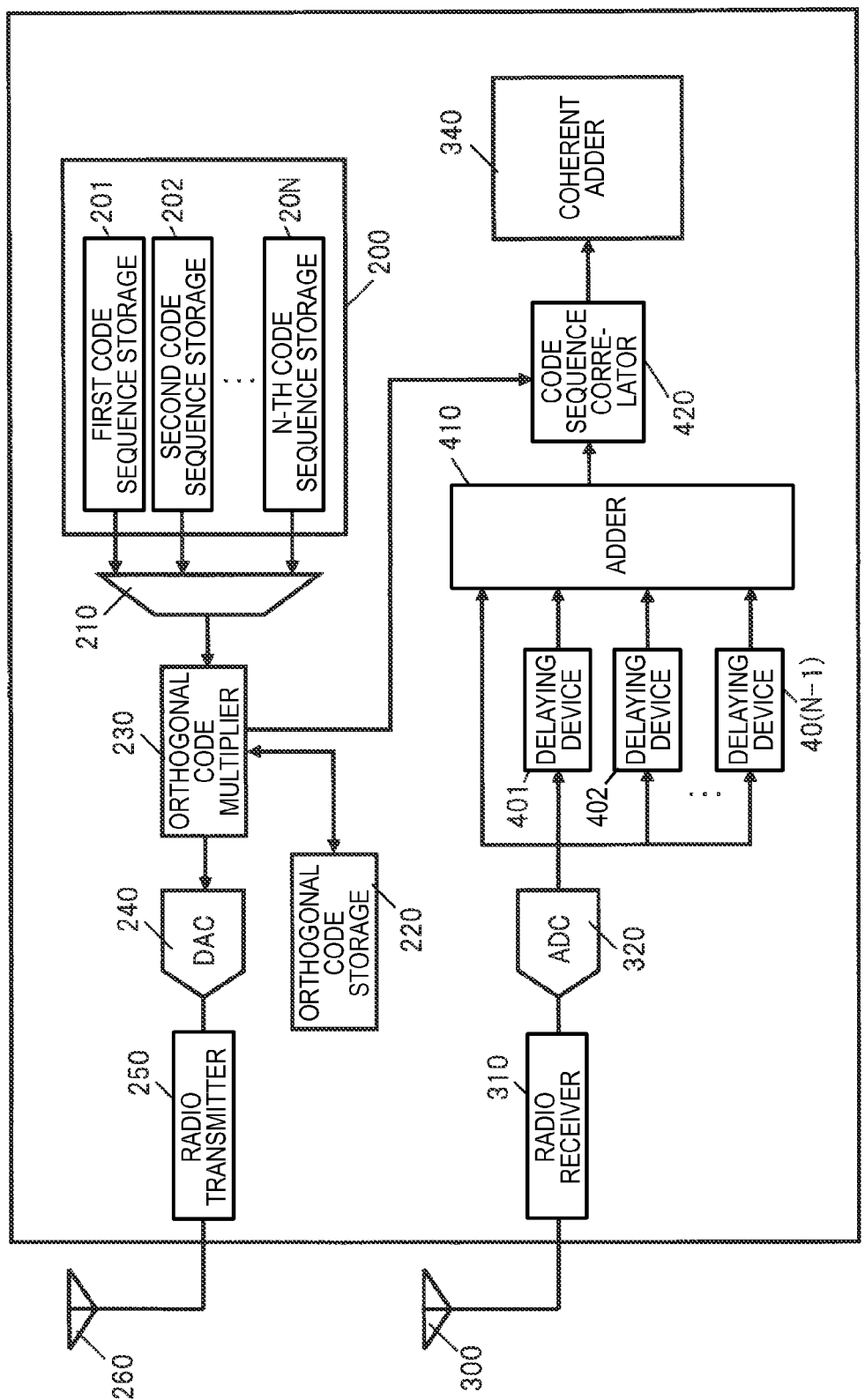
FIG. 6 is a block diagram showing the internal configuration of a radar apparatus of a second embodiment.

FIG. 6 is a block diagram showing the internal configuration of the radar apparatus 100A of the second embodiment. The radar apparatus 100A shown in FIG. 6 includes the code storage 200, the selector 210, the orthogonal code sequence storage 220, the orthogonal code multiplier 230, the DAC 240, the radio transmitter 250 to which the transmission antenna 260 is connected, the radio receiver 310 to which the reception antenna 300 is connected, the ADC 320, (N−1) delaying devices 401, 402 to 40N−1, an adder 410, a code sequence correlator 420, and the coherent adder 340.

In the description of the radar apparatus 100A shown in FIG. 6, the components which are identical in configuration and operation to those of the radar apparatus 100 shown in FIG. 1 are denoted by the same reference numerals, their description is omitted or simplified, and different contents will be described.

In the radar apparatus 100A shown in FIG. 6, the output of the ADC 320 is input to the (N−1) delaying devices 401 to 40N−1. The operations of the delaying devices are identical to one another except the amount of delay which is to be added to input digital baseband reception pulses. Therefore, the delaying device 401 will be mainly described, and, with respect to the operations of the other delaying devices 402 to 40(N−1), contents different from those of the delaying device 401 will be described.

The delaying device 401 adds a predetermined amount of delay to the digital baseband reception pulse which is the output of the ADC 320, and then outputs the pulse to the adder 410. The amount of delay which is to be added by the delaying device 401 is previously determined, and equals, for example, to a time difference from the transmission timing of the transmission pulse P11 in which the first code sequence A or B is used, to that of the transmission pulse P12 in which the second code sequence C or D is used.

The amount of delay which is to be added by the delaying device 402 is previously determined, and equals, for example, to a time difference from the transmission timing of the transmission pulse P11 in which the first code sequence A or B is used, to that of the transmission pulse P13 in which the third code sequence E or F is used.

Similarly, the amount of delay which is to be added by the delaying device 40(N−1) is previously determined, and equals, for example, to a time difference from the transmission timing of the transmission pulse P11 in which the first code sequence A or B is used, to that of the transmission pulse P1N in which the N-th (for example, N=4) code sequence G or H is used.

The adder 410 adds together a total of N reception pulses, or reception pulses to which the (N−1) delaying devices 401 to 40(N−1) add the different amounts of delay, and the reception pulse to which an amount of delay is not added, and outputs the addition result to the code sequence correlator 420.

Figure 7:
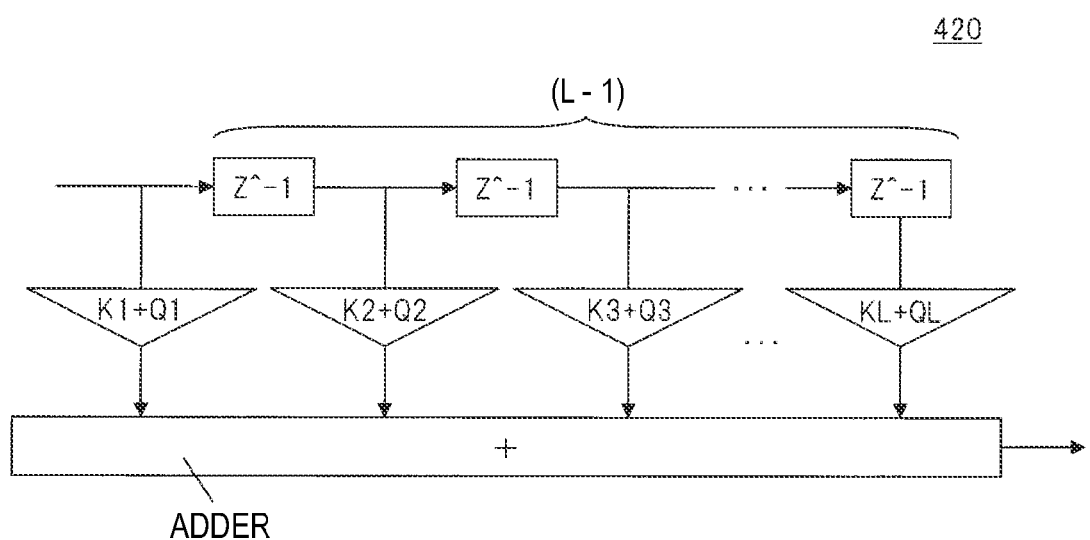
FIG. 7 is a configuration diagram of a correlator in the radar apparatus of the second embodiment in the case of, for example, N=2.

Here, the configuration of the code sequence correlator 420 in the embodiment will be described with reference to FIG. 7. FIG. 7 is a configuration diagram of the code sequence correlator 420 in the radar apparatus 100A of the second embodiment in the case where, for example, N is 2 (N=2) in order to simplify the description.

The code sequence correlator 420 shown in FIG. 7 includes L correlation coefficient holders (K1+Q1), (K2+Q2) to (KL+QL), (L−1) delaying devices ($z^{-1}$), and an adder. L is an integer of a power of 2, and indicates the code length of a transmission pulse. The code sequence correlator 420 performs the correlation calculation while using the time period of M transmission periods as the correlation calculation time period.

When the correlation calculation time period is started, the code sequence correlator 420 sets a result of addition of codes of transmission pulses in which the first code sequence and the second (N=2) code sequence are used, as correlation coefficients (tap coefficients) K1+Q1, K2+Q2, K3+Q3 to KL+QL in the L correlation coefficient holders shown in FIG. 7, and holds the correlation coefficients (K1+Q1 to KL+QL) during the correlation calculation time period.

The correlation coefficients K1, Q1 to KL, QL have a value of +1 or −1. Therefore, the correlation coefficients in the code sequence correlator 420 have a value of one of +2, 0, and −2.

The code sequence correlator 420 calculates the sliding correlation values of the N reception pulses which are added by the adder 410 while using the result of the addition of the codes of the transmission pulse in which the first code sequence and the second code sequence are used, as correlation coefficients, and outputs the calculated value to the coherent adder 340. The operation of the coherent adder 340 is similar to that in the first embodiment, and therefore its description is omitted.

From the above, the radar apparatus 100A of the embodiment calculates sliding correlation values between N transmission pulses which are transmitted during one transmission period, and reception pulses, by using the single code sequence correlator 420 in place of the configuration of the first code sequence correlator 331 to the N-th code sequence correlator 33N in the radar apparatus 100 of the first embodiment.

Therefore, the radar apparatus 100A can achieve effects similar to those of the radar apparatus of the first embodiment, and the configuration of the code sequence correlator can be simplified as compared with the radar apparatus 100 of the first embodiment. Therefore, the circuit scale of the radar apparatus 100A can be reduced, and the production cost can be lowered.

(Third Embodiment)

The first and second embodiments have been described on the assumption that the interval of transmission timings of at least one set of adjacent ones of the N transmission pulses which are transmitted in one transmission period, i.e., two transmission pulses is fixed over M transmission periods.

In a third embodiment, a radar apparatus 100B in which the interval of transmission timings of at least one set of adjacent ones of the N transmission pulses which are transmitted in one transmission period, i.e., two transmission pulses is changed will be described.

Figure 8:
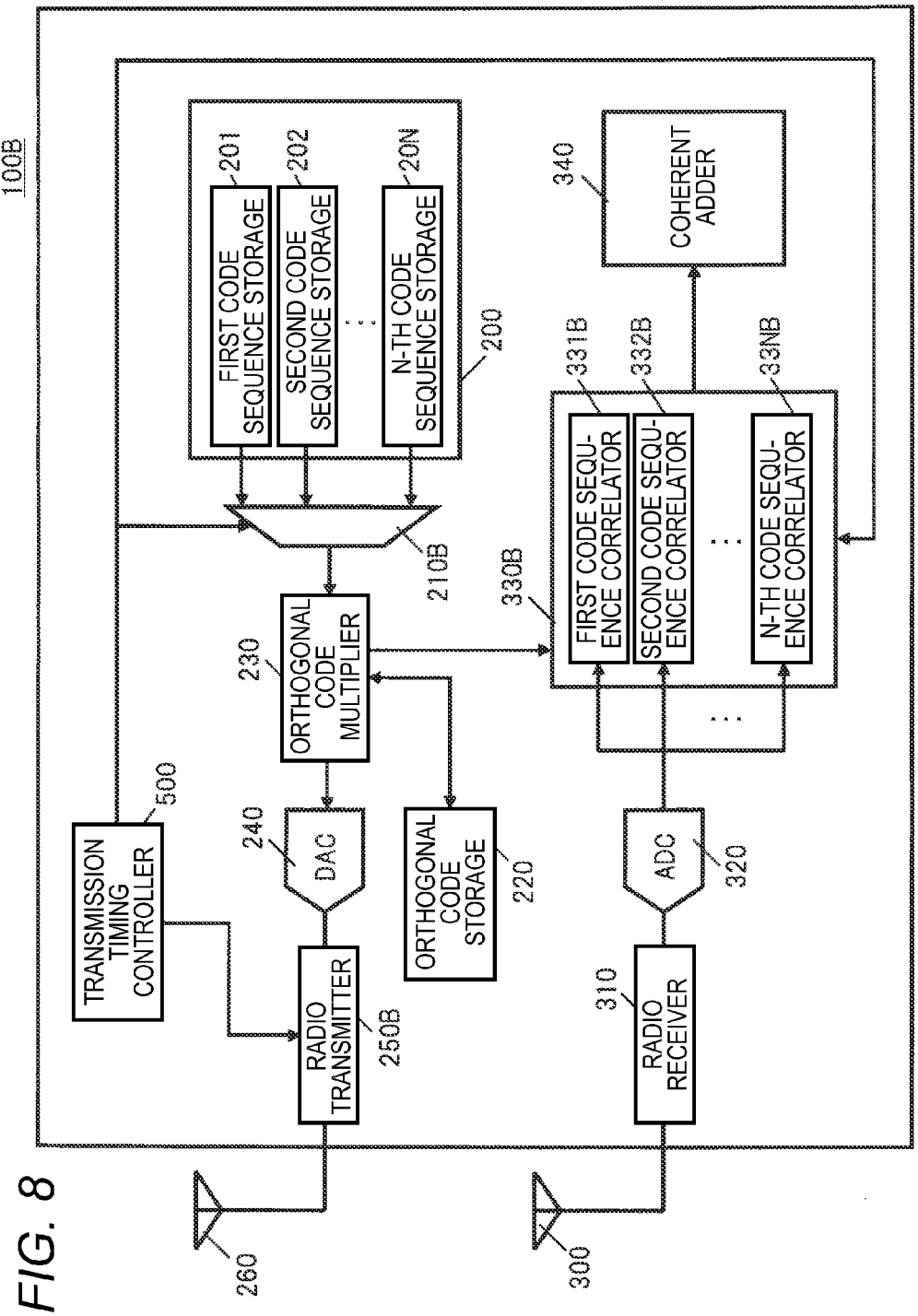
FIG. 8 is a block diagram showing the internal configuration of a radar apparatus of a third embodiment.

FIG. 8 is a block diagram showing the internal configuration of the radar apparatus 100B of the third embodiment. The radar apparatus 100B shown in FIG. 8 includes a transmission timing controller 500, the code storage 200, a selector 210B, the orthogonal code sequence storage 220, the orthogonal code multiplier 230, the DAC 240, a radio transmitter (RF transmitter) 250B to which the transmission antenna 260 is connected, the radio receiver (RF receiver) 310 to which the reception antenna 300 is connected, the ADC 320, a code sequence correlator 330B, and the coherent adder 340.

The code sequence correlator 330B which functions as a correlation calculator includes a first code sequence correlator 331B, and a second code sequence correlator 332B to an N-th code sequence correlator 33NB, or has N kinds of different correlators the number of which is equal to that of the kinds of the transmission code sequences.

A transmission signal generator in the radar apparatus 100B of the embodiment can be configured by using at least the code sequence storage 200, the selector 210B, the orthogonal code storage 220, and the orthogonal code multiplier 230.

In the description of the radar apparatus 100B shown in FIG. 8, the components which are identical in configuration and operation to those of the radar apparatus 100 shown in FIG. 1 are denoted by the same reference numerals, their description is omitted or simplified, and different contents will be described.

The transmission timing controller 500 produces, for every M transmission periods, a transmission timing control signal for changing the interval of transmission timings of at least one set of adjacent ones of the N transmission pulses which are transmitted in one transmission period, i.e., two transmission pulses. The transmission timing controller 500 outputs the transmission timing control signal to the selector 210B, the radio transmitter 250B, and the code sequence correlator 330B.

The interval of transmission timings of at least one set of adjacent ones of the N transmission pulses which are transmitted in one transmission period, i.e., two transmission pulses is not particularly limited as far as it constitutes different intervals and does not temporally overlap the transmission time period of another transmission pulse. For example, the interval of transmission pulses may monotonically increase in each of M transmission periods, or may be changed by using a table of random numbers.

Based on the transmission timing control signal produced by the transmission timing controller 500, the selector 210B changes and selects, for every M transmission periods, the interval of selection timings of transmission codes used for producing at least one set of adjacent ones of the N transmission pulses which are transmitted in one transmission period, i.e., two transmission pulses.

Based on the transmission timing control signal produced by the transmission timing controller 500, the radio transmitter 250B changes and transmits, for every M transmission periods, the interval of transmission timings of at least one set of adjacent ones of the N transmission pulses which are transmitted in one transmission period, i.e., two transmission pulses.

Figure 9:
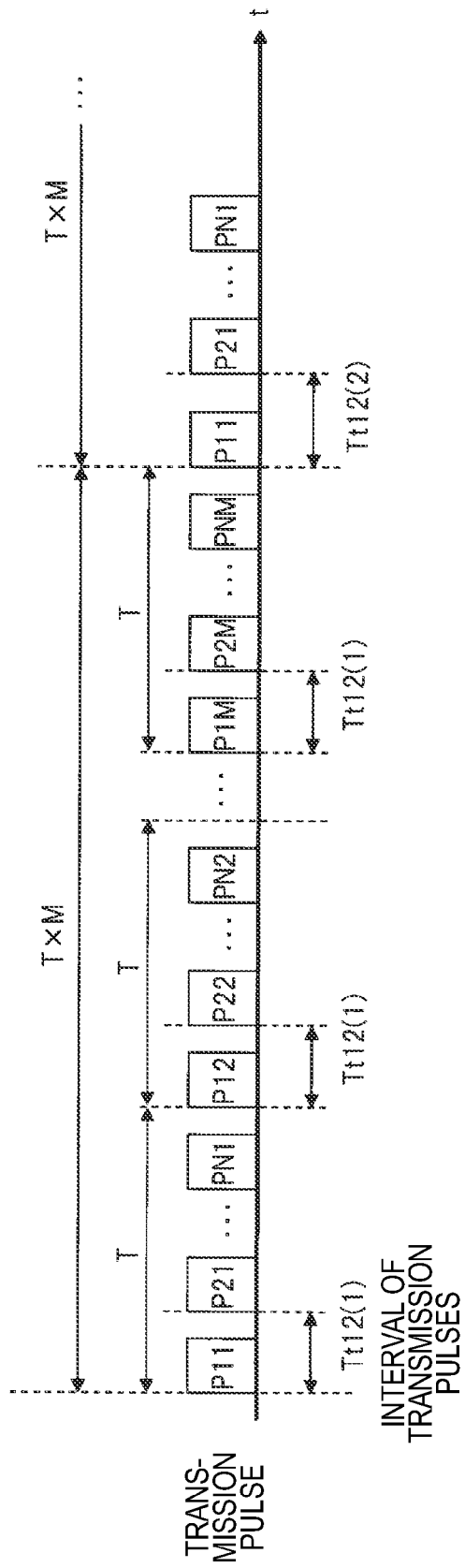
FIG. 9 is a view showing an example of intervals of transmission timings of transmission pulses in the radar apparatus of the third embodiment.

FIG. 9 is a view showing an example of intervals of transmission timings of transmission pulses in the radar apparatus 100B of the third embodiment. For the sake of simplicity of description, in FIG. 9, an example in which the interval of transmission timings of the transmission pulse P11 and the transmission pulse P21 is changed for every M transmission periods will be described. However, the interval to be changed is not limited to the interval of transmission timings of the transmission pulse P11 and the transmission pulse P21.

In the initial M transmission periods shown in FIG. 9, for example, the intervals of transmission timings of the transmission pulse P11 and the transmission pulse P21 are constant or T12(1).

In the second M transmission periods shown in FIG. 9, the transmission timing controller 500 produces a transmission timing control signal for changing the intervals of transmission timings of the transmission pulse P11 and the transmission pulse P21, to T12(2) (≠T12(1)). In the second M transmission periods shown in FIG. 9, therefore, the radar apparatus 100B can change the intervals of transmission timings of the transmission pulse P11 and the transmission pulse P21 to T12(2).

Among the first code sequence correlator 331B to the N-th code sequence correlator 33NB, for every M transmission periods, code sequence correlators that use transmission pulses in which the intervals of transmission timings are changed are used as correlation coefficients change the start timing of the correlation calculation time period of the own sliding correlation value, in accordance with a transmission code sequence to be used for producing at least one set, i.e., two transmission pulses in which the intervals of transmission timings are changed, based on the transmission timing control signal produced by the transmission timing controller 500.

In FIG. 9, for example, the interval of transmission timings of the transmission pulse P11 and the transmission pulse P21 is changed. Based on the transmission timing control signal produced by the transmission timing controller 500, therefore, the first code sequence correlator 331B and the second code sequence correlator 332B change the start timing of the correlation calculation time period of the own sliding correlation value, for every M transmission periods.

Although not shown, in the case where the radar apparatus 100 B shown in FIG. 6 further includes the transmission timing controller 500, the transmission timing controller 500 outputs the transmission timing control signal to the delaying devices 401 to 40(N−1).

Among the delaying devices 401 to 40(N−1), for every M transmission periods, delaying devices that add the time difference between transmission pulses in which the interval of transmission timings is changed, and the transmission pulse that is initially transmitted, as the amount of delay change the amount of delay of the digital baseband reception pulses that are outputs of the ADC 320, in accordance with the changed intervals of transmission timings, based on the transmission timing control signal produced by the transmission timing controller 500.

In FIG. 9, for example, the interval of transmission timings of the transmission pulse P11 and the transmission pulse P21 is changed from T12(1) to T12(2). Based on the transmission timing control signal produced by the transmission timing controller 500, for every M transmission periods, therefore, the delaying device 401 changes the amount of delay of the digital baseband reception pulses which are outputs of the ADC 320, from T12(1) to T12(2).

Figure 10:
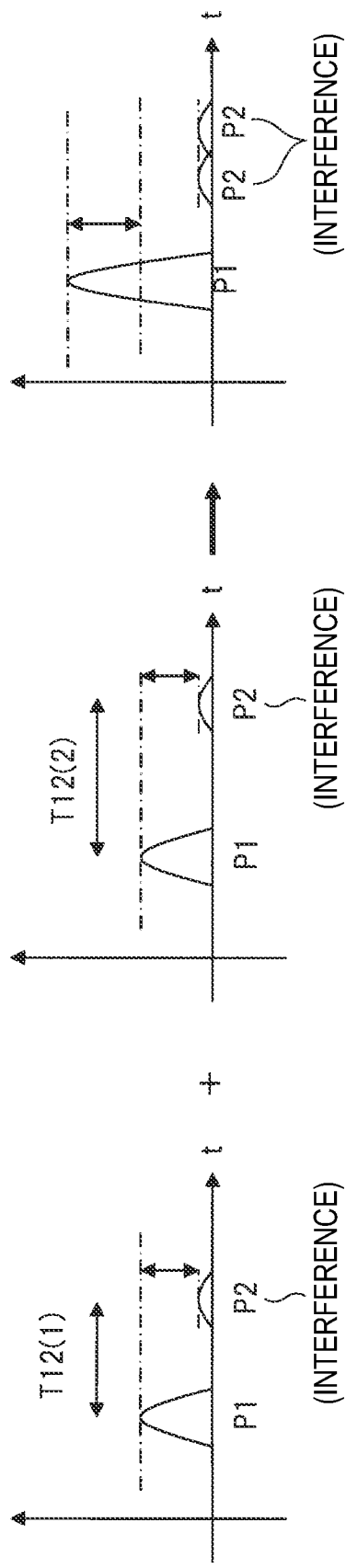
FIG. 10 is a view showing a result of coherent addition in the radar apparatus of the third embodiment.

FIG. 10 is a view showing a result of coherent addition in the radar apparatus 100B of the third embodiment. The leftmost figure shown in FIG. 10 indicates a result of coherent addition of sliding correlation values which are calculated by the first code sequence correlator 331B over M transmission periods which are before the change of the intervals of transmission timings of, for example, the transmission pulse P11 and the transmission pulse P21 or from T12(1) to T12(2).

The result of coherent addition contains a peak of sliding correlation values of transmission pulses (desired wave) in which, for example, the first code sequence is used, and residual interference components between the transmission pulses in which the first code sequence is used, and those in which the second code sequence is used. With respect to FIG. 10, the same shall apply hereinafter.

Moreover, the middle figure shown in FIG. 10 indicates a result of coherent addition of sliding correlation values which are calculated by the first code sequence correlator 331B over M transmission periods which are after the change of the intervals of transmission timings of, for example, the transmission pulse P11 and the transmission pulse P21 or from T12(1) to T12(2).

Furthermore, the rightmost figure shown in FIG. 10 indicates a result of coherent addition over a total of 2M transmission periods of the leftmost figure shown in FIG. 10 and the middle figure shown in FIG. 10.

In the leftmost figure shown in FIG. 10, interference components between the transmission pulse P11 and the transmission pulse P21 are canceled in an ideal environment (for example, in a place where line-of-sight communication is enabled or a direct wave can be used) by a result of coherent addition of sliding correlation values which are calculated over M transmission periods.

In a non-ideal environment, however, environmental variation (for example, variation of a communication propagation path) may cause a case where interference components between the transmission pulse P11 and the transmission pulse P21 are hardly canceled, and residual interference components may be produced in the result of coherent addition of correlation outputs of the first code sequence correlator 331B (see the leftmost and middle figures shown in FIG. 10).

In the leftmost and middle figures shown in FIG. 10, the intervals of transmission timings of the transmission pulse P11 and the transmission pulse P21 are changed from T12(1) to T12(2), and therefore the time periods where residual interference components in the result of coherent addition appear are different from each other.

In the rightmost figure shown in FIG. 10, in a result of coherent addition over 2M transmission periods, the transmission pulse P11 is identical in size with that appearing in a result of coherent addition over M transmission periods, because a two-fold gain of coherent addition is obtained by further coherent addition on the results of coherent addition of the leftmost and middle figures shown in FIG. 10, but the intervals of the transmission timings are changed in residual interference components.

From the above, the radar apparatus 100B of the embodiment changes, in accordance with the transmission timing control signal produced by the transmission timing controller 500, the intervals of transmission timings of at least two transmission pulses of N transmission pulses which are transmitted in one transmission period.

In the radar apparatus 100B, because of a result of coherent addition over the 2M transmission periods shown in the rightmost figure of FIG. 10, in, for example, the transmission pulse P11, therefore, a two-fold gain of coherent addition is obtained in the transmission pulse P11 which is a desired wave, in a result of coherent addition over M transmission periods, and the reception SNR can be further improved as compared with the size of residual interference components.

(Fourth Embodiment)

The first to third embodiments have been described on the assumption that the directionality in transmission in which the radar apparatus repeats M times N transmission pulses that are transmitted in one transmission period T is fixed. Also in the first to third embodiments, when an array antenna using a plurality of antennas is prepared, and the directionality is controlled in unit of (M×N) transmission pulses, the transmission beam can be controlled.

In a fourth embodiment, a radar apparatus 100C in which the directionality (direction of the main beam) of N transmission pulses that are transmitted in one transmission period is switched will be described.

Figure 11:
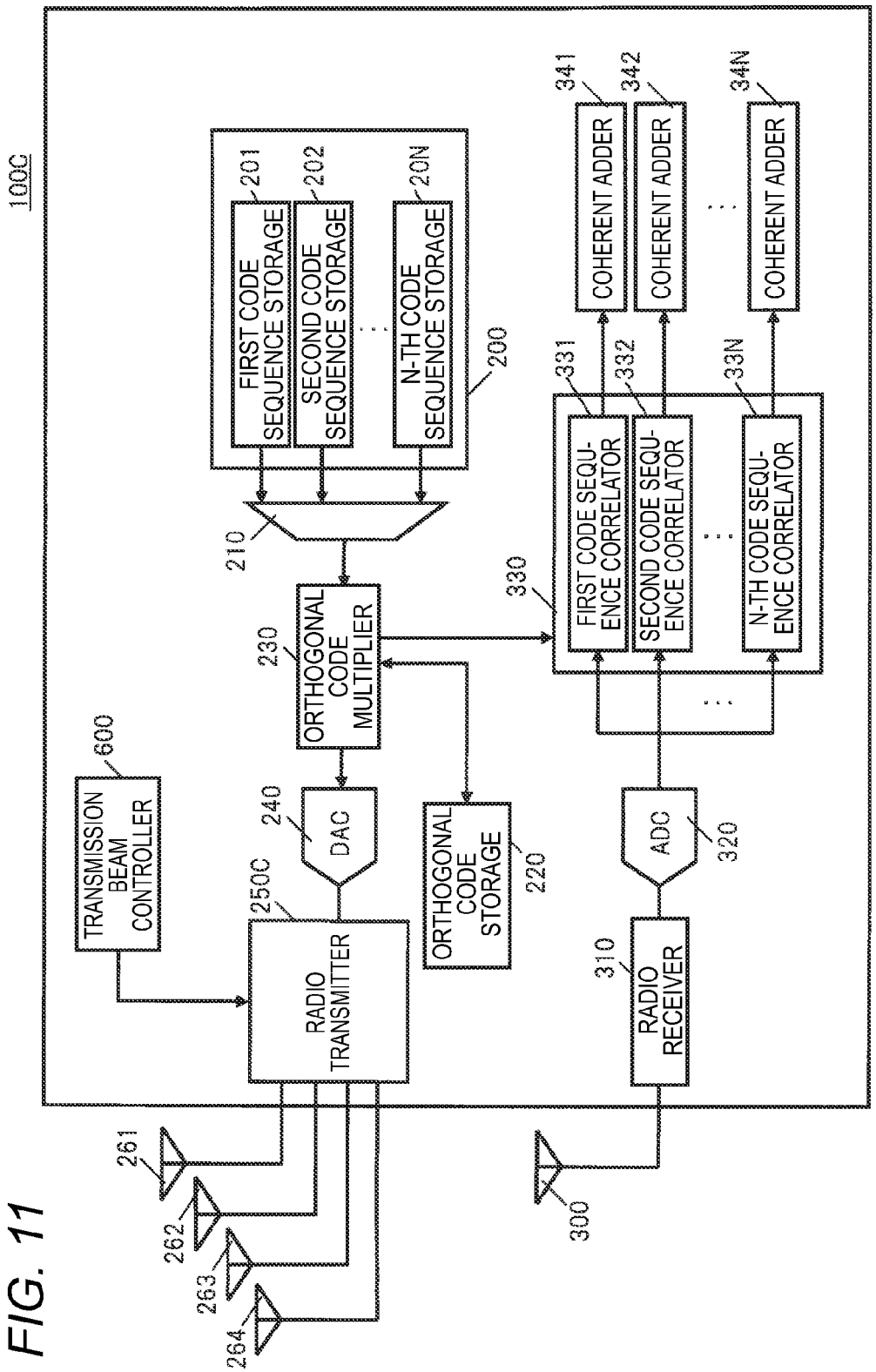
FIG. 11 is a block diagram showing the internal configuration of a radar apparatus of a fourth embodiment.

FIG. 11 is a block diagram showing the internal configuration of the radar apparatus 100C of the fourth embodiment. The radar apparatus 100C shown in FIG. 11 includes a transmission beam controller 600, the code sequence storage 200, the selector 210, the orthogonal code storage 220, the orthogonal code multiplier 230, the DAC 240, a radio transmitter (RF transmitter) 250C to which, for example, four transmission antennas 261, 262, 263, 264 are connected, the radio receiver (RF receiver) 310 to which the reception antenna 300 is connected, the ADC 320, the code sequence correlator 330, and coherent adders 341, 342 to 34N.

In the description of the radar apparatus 100C shown in FIG. 11, the components which are identical in configuration and operation to those of the radar apparatus 100 shown in FIG. 1 are denoted by the same reference numerals, their description is omitted or simplified, and different contents will be described.

In the first transmission period, for example, the transmission beam controller 600 produces a transmission beam control signal indicating different main beam directions of the transmission pulses of the N transmission pulses P11 to PN1 to be transmitted, for every N transmission pulses. In the first transmission period, for example, the transmission beam controller 600 sequentially outputs the N transmission beam control signals which are produced for every transmission pulse, to the radio transmitter 250C.

Figure 12:
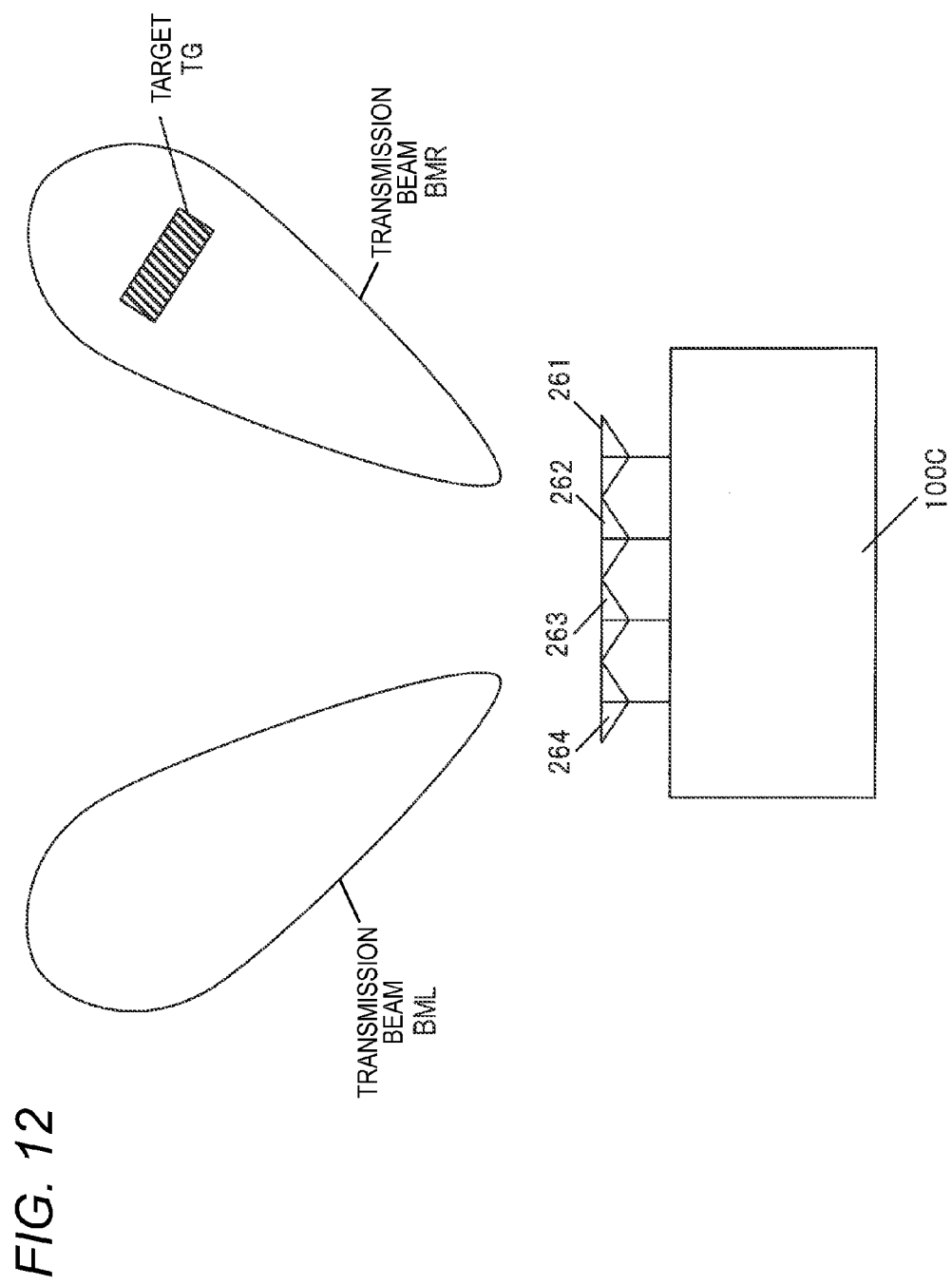
FIG. 12 is a view illustrating transmission beams in the radar apparatus of the fourth embodiment.

The radio transmitter 250C includes a phase shifter (not shown) which changes the phase of a transmission pulse, for every four transmission antennas 261 to 264. The radio transmitter 250C transmits transmission pulses in which the main beam direction corresponding to the transmission beam control signal is formed by changing the phase of the transmission pulse based on the N transmission beam control signals which are produced in each phase shifter for every transmission pulse by the transmission beam controller 600 (see FIG. 12). FIG. 12 is a view illustrating transmission beams in the radar apparatus 100C of the fourth embodiment.

The radio transmitter 250C uses the plurality of transmission antennas 261 to 264, and electronically changes the phases of transmission pulses by the phase shifters, thereby switching the main beam direction of transmission pulses to be transmitted from the transmission antennas. Alternatively, the main beam direction of transmission pulses may be mechanically switched. Moreover, the radar apparatus 100C has a plurality of reception antennas in a similar manner as the transmission antennas, and electronically or mechanically switches the directionality of reception pulses.

Figure 13:
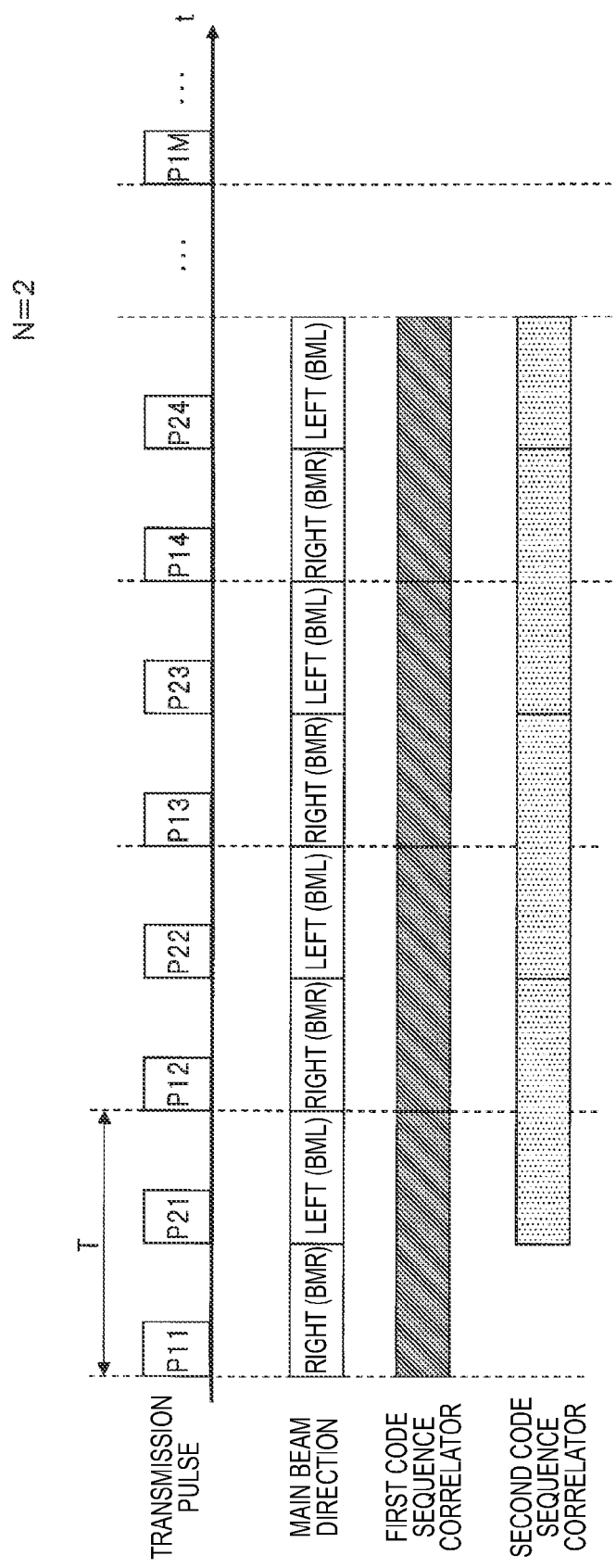
FIG. 13 is a view showing transmission pulses, beam directions, and correlation calculation time periods of a first code sequence correlator and second code sequence correlator in the radar apparatus of the fourth embodiment in the case of, for example, N=2.

For the sake of simplicity of description, in one transmission period, as two kinds (N=2) of transmission beams, for example, the radar apparatus 100C of the embodiment transmits a transmission beam BMR (transmission pulses) in which a right main beam direction is provided to a transmission pulse in which the first code sequence is used, and further transmits a transmission beam BML (transmission pulses) in which a left main beam direction is provided to a transmission pulse in which the second code sequence is used (see FIGS. 12 and 13).

FIG. 13 is a view showing transmission pulses, main beam directions, and correlation calculation time periods of the first code sequence correlator 331 and the second code sequence correlator 332 in the radar apparatus 100C of the fourth embodiment in the case of, for example, N=2.

In the first transmission period shown in FIG. 13, the radar apparatus 100C transmits the transmission beam BMR in which a right main beam direction is provided to the transmission pulse P11 in which the first code sequence is used, and further transmits the transmission beam BML in which a left main beam direction is provided to a transmission pulse in which the second code sequence is used. Also in the second and subsequent transmission periods shown in FIG. 13, similarly in the first transmission period, moreover, the radar apparatus 100C repeats the transmission of the transmission beam BMR to which a right main beam direction is provided, and the transmission beam BML to which a left main beam direction is provided.

In the case where a target TG exists in the direction of the transmission beam BMR shown in FIG. 12, for example, the signal power of a reception pulse that is obtained by reflecting the transmission beam BMR to which a right main beam direction is provided, from the target TG is increased, and that of a reception pulse that is obtained by reflecting the transmission beam BML to which a left main beam direction is provided, from the target TG is small.

In the first code sequence correlator 331, in each transmission period, codes of transmission pulses in which the first code sequence is used are used as correlation coefficients.

Therefore, the sliding correlation value between the reception pulse that is obtained by reflecting the transmission beam BMR to which a right main beam direction is provided, from the target TG, and the transmission pulse is large, and that between the reception pulse that is obtained by reflecting the transmission beam BMR to which a left main beam direction is provided, from the target TG, and the transmission pulse is small.

In the coherent adder 341 to which the correlation output of the first code sequence correlator 331 is input, the gain of coherent addition is obtained in a result of coherent addition of sliding correlation values between reception pulses that are obtained by reflecting the transmission beam BMR to which a right main beam direction is provided, from the target TG, and transmission pulses.

By contrast, a result of coherent addition of sliding correlation values between reception pulses that are obtained by reflecting the transmission beam BMR to which a left main beam direction is applied, from the target TG, and the transmission pulses, i.e., interference residual components are reduced.

In the second code sequence correlator 332, in each transmission period, codes of transmission pulses in which the second code sequence is used are used as correlation coefficients.

Therefore, the sliding correlation value between the reception pulse that is obtained by reflecting the transmission beam BMR to which a right main beam direction is provided, from the target TG, and the transmission pulse is small, and that between the reception pulse that is obtained by reflecting the transmission beam BML to which a left main beam direction is provided, from the target TG, and the transmission pulse is similarly small.

In the coherent adder 342 to which the correlation output of the second code sequence correlator 332 is input, the gain of coherent addition is not obtained in a result of coherent addition of sliding correlation values between reception pulses that are obtained by reflecting the transmission beam BML to which a left main beam direction is provided, from the target TG, and transmission pulses.

Moreover, a result of coherent addition of sliding correlation values between reception pulses that are obtained by reflecting the transmission beam BMR to which a right main beam direction is provided, from the target TG, and transmission pulses, i.e., interference residual components are reduced.

From the above, in accordance with the transmission beam control signal produced by the transmission beam controller 600, the radar apparatus 100C of the embodiment transmits transmission beams in which different main beam directions are switched in N transmission pulses that are transmitted in one transmission period.

Therefore, the radar apparatus 100C achieves the effects of the radar apparatus 100 of the first embodiment, and, in results of coherent additions of the coherent adders 341 to 34N, the gain of coherent addition is obtained in the case where the target exists in the direction of the main beam direction of the transmission beam.

Therefore, the radar apparatus 100C can use the results of coherent additions of the coherent adders 341 to 34N to which the correlation outputs of the first code sequence correlator 331 to the N-th code sequence correlator 33N are input, as results of coherent additions of N sector radars.

Moreover, the radar apparatus 100C transmits a transmission beam in which the main beam is switched to transmission pulses of each transmission code sequence, and therefore it is possible to suppress interference between transmission beams of transmission pulses.

(Fifth Embodiment)

In the above-described embodiments, the center frequencies of local signals that are used in conversion of transmission code sequences to high-frequency signals by the radio transmitter of the radar apparatus are identical.

In a fifth embodiment, a radar apparatus 100E in which the center frequencies of local signals that are used in conversion of transmission code sequences to high-frequency signals by the radio transmitter are made different will be described.

Figure 16:
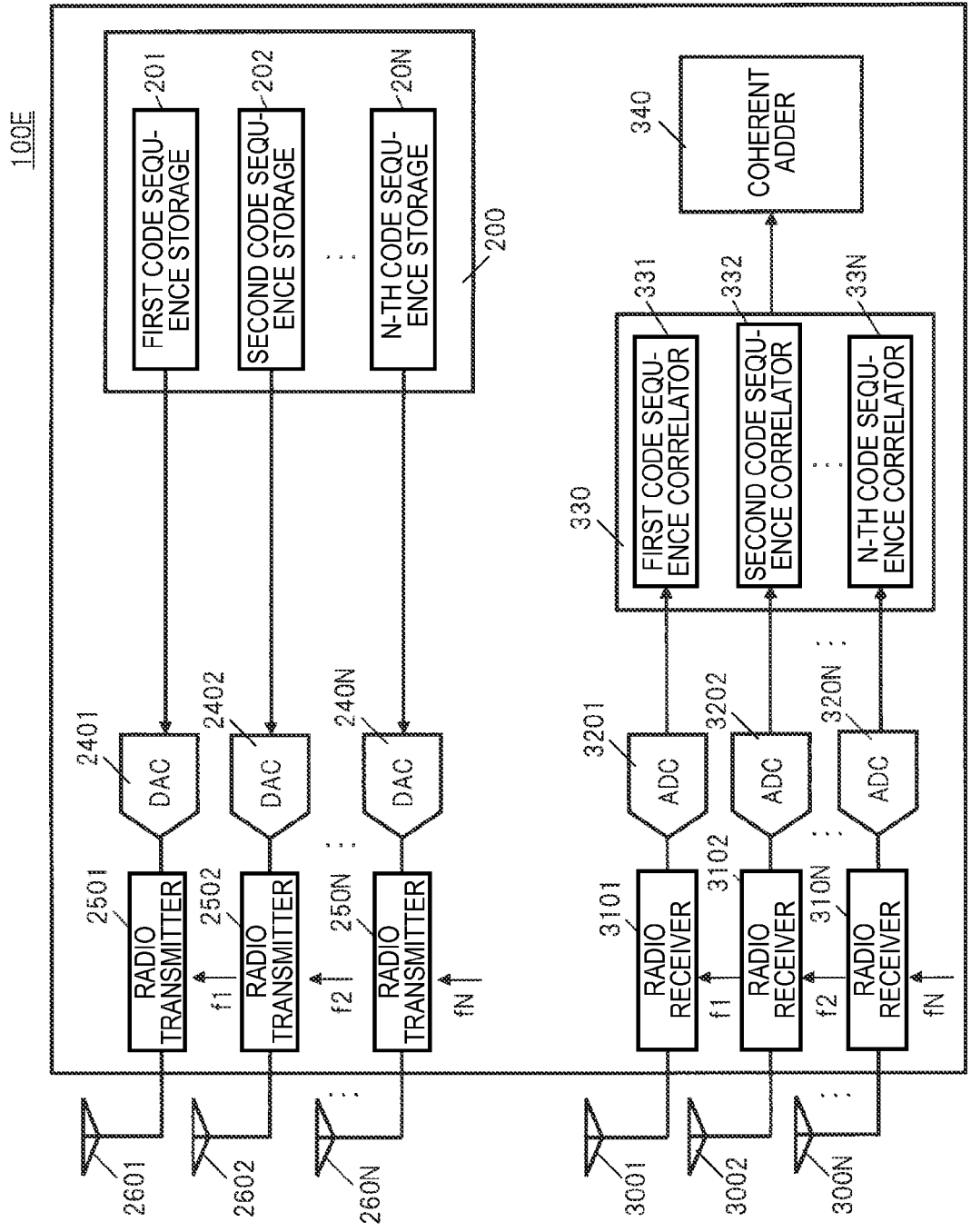
FIG. 16 is a block diagram showing the internal configuration of a radar apparatus of a fifth embodiment.

FIG. 16 is a block diagram showing the internal configuration of the radar apparatus 100E of the fifth embodiment. The radar apparatus 100E shown in FIG. 16 includes the code sequence storage 200, the N DACs 2401 to 240N, the radio transmitters (RF transmitters) 2501 to 250N to which the N transmission antennas 2601 to 260N are respectively connected, radio receivers (RF receivers) 3101 to 310N to which N reception antennas 3001 to 300N are respectively connected, N ADCs 3201 to 320N, the code sequence correlator 330, and the coherent adder 340.

The radar apparatus 100E shown in FIG. 16, and the radar apparatus 100 shown in FIG. 1 are different from each other in that the number of the sets (hereinafter, referred to as "transmission systems") of a DAC, a radio transmitter, and a transmission antenna is N which is equal to that of the kinds of the transmission code sequences, the number of the sets (hereinafter, referred to as "reception systems") of a reception antenna, a radio receiver, and an ADC is N which is equal to that of the kinds of the transmission code sequences, and orthogonal codes are not used. N is an integer of 2 or more, and identical with the number of kinds of transmission code sequences stored in the code sequence storage 200.

In the radar apparatus 100E, the center frequencies which are used in the radio transmitters 2501 to 250N of the transmission systems, and the radio receivers 3101 to 310N of the reception systems are different. The center frequency which is used in a k-th (k: an integer of 1 to N) radio transmitter, and that which is used in a k-th radio receiver are equal to each other. The N transmission code sequences may be identical with or different from each other.

In the radar apparatus 100E, a k-th reception system performs the correlation calculation on transmission pulses produced in the k-th transmission system by using a code sequence corresponding to the transmission pulses produced in the k-th transmission system.

Form the above, the radar apparatus 100E of the embodiment uses the radio transmitters 2501 to 250N which produce the signals of the N kinds of different center frequencies, and the radio receivers 3101 to 310N which convert a high-frequency reception signal to a baseband signal, whereby superimposition of orthogonal codes in transmission code sequences is omitted, and generation of interference of transmission pulses transmitted among the transmission systems can be suppressed.

Therefore, the radar apparatus 100E can transmit N transmission pulses in one transmission period T, and obtain an SNR which is superior by N times to the case where one transmission pulse is transmitted. When the radar apparatus 100E of the embodiment is combined with the radar apparatus 100 of the first embodiment, i.e., when orthogonal codes are further superimposed on (multiplied with) transmission code sequences, and the center frequencies which are used in the transmission systems are differentiated, a further excellent SNR is obtained.

Although various embodiments have been described with reference to the drawings, it is a matter of course that the disclosure is not restricted to the examples. It is obvious to those skilled in the art that various changes and modifications can be made within the scope of the appended claims, and it is to be understood that they naturally belong to the technical scope of the disclosure.

In the fourth embodiment, the radar apparatus 100C transmits transmission beams in which the main beam direction is switched to transmission pulses of each transmission code sequence. In a modification of the fourth embodiment, transmission beams in which the main beam direction is switched for every a plurality of transmission code sequences may be transmitted.

When N=4, for example, the radar apparatus 100C transmits a transmission beam in which a right main beam direction is provided to transmission pulses in which the first code sequence and the second code sequence are used, and further transmits a transmission beam in which a left main beam direction is provided to transmission pulses in which the third code sequence and the fourth code sequence are used.

The radar apparatus 100C compares a result of coherent addition of sliding correlation values between reception pulses that are obtained by reflecting transmission pulses in which the first and second code sequences are used, from the target, and the transmission pulses, with a result of coherent addition of sliding correlation values between reception pulses that are obtained by reflecting transmission pulses in which the third and fourth code sequences are used, from the target, and the transmission pulses.

In the radar apparatus 100C, when results of coherent additions are used as results of coherent additions in the first sector radar and the second sector radar, therefore, a two-fold reception SNR is obtained as compared with the case where a radar apparatus in the prior art transmits transmission pulses in which one transmission code sequence is used in one transmission period.

The configuration of the radar apparatus 100C of the fourth embodiment and the above-described modification of the fourth embodiment may be added to and combined with that of the radar apparatus 100A of the second embodiment or the radar apparatus 100B of the third embodiment.

The application is based on Japanese Patent Application (No. 2013-058611) filed Mar. 21, 2013, and its disclosure is incorporated herein by reference.

INDUSTRIAL APPLICABILITY

The disclosure is useful as a radar apparatus in which interference among transmission pulses is suppressed by a simple configuration, and a high reception SNR is obtained.

REFERENCE SIGNS LIST

100, 100A, 100B, 100C radar apparatus
200 code sequence storage
201 first code sequence storage
202 second code sequence storage
20N N-th code sequence storage
210 selector
220 orthogonal code storage
230 orthogonal code multiplier
240 DAC
250, 250C radio transmitter
260 transmission antenna
300 reception antenna
310 radio receiver
320 ADC
330, 420 code sequence correlator
331 first code sequence correlator
332 second code sequence correlator
33N N-th code sequence correlator
340, 341, 342, 34N coherent adder
401, 40(N−1) delaying device
410 adder
500 transmission timing controller
600 transmission beam controller

The invention claimed is:

1. A radar device comprising:
a transmission signal generator which produces N transmission pulses for every transmission period from N (N: an integer of 2 or more) kinds of transmission code sequences and (N×M) (M: an integer of 2 or more) kinds of orthogonal code sequences, the transmission pulses being obtained by multiplying transmission codes of the N kinds of transmission code sequences, with selected N orthogonal codes of the (N×M) kinds of orthogonal code sequences; and
a radio transmitter which, in one transmission period, converts the N transmission pulses to high-frequency signals, and transmits the signals through a transmission antenna,
wherein the (N×M) kinds of orthogonal code sequences are code sequences which satisfy an expression (1) in M transmission periods; and $$\begin{pmatrix} C11 & C12 & C13 & \cdots & C1M \\ C21 & C22 & C23 & \cdots & C2M \\ C31 & C32 & C33 & \cdots & C3M \\ \vdots & \vdots & \vdots & \ddots & \vdots \\ CN1 & CN2 & CN3 & \cdots & CNM \end{pmatrix}$$

$$\begin{pmatrix} C11 & C21 & C31 & \cdots & CN1 & C1M & C2M & C3M & \cdots & CNM \\ C12 & C22 & C32 & \cdots & CN2 & C11 & C21 & C31 & \cdots & CN1 \\ C13 & C23 & C33 & \cdots & CN3 & C12 & C22 & C32 & \cdots & CN2 \\ \vdots & \vdots & \vdots & \ddots & \vdots & \vdots & \vdots & \vdots & \ddots & \vdots \\ C1M & C2M & C3M & \cdots & CNN & C1M-1 & C2M-1 & C3M-1 & \cdots & CNM-1 \end{pmatrix}$$

$$= \begin{pmatrix} M & 0 & 0 & \cdots & 0 & * & 0 & 0 & \cdots & 0 \\ 0 & M & 0 & \cdots & 0 & 0 & * & 0 & \cdots & 0 \\ 0 & 0 & M & \cdots & 0 & 0 & 0 & * & \cdots & 0 \\ \vdots & \vdots & \vdots & \ddots & \vdots & \vdots & \vdots & \vdots & \ddots & \vdots \\ 0 & 0 & 0 & \cdots & M & 0 & 0 & 0 & \cdots & * \end{pmatrix}$$

wherein CNM is an orthogonal code which is multiplied with an N-th transmission code in an M-th transmission period.

2. The radar device according to claim 1, wherein the transmission signal generator includes:
a transmission code storage which stores the N kinds of transmission code sequences;
an orthogonal code storage which stores the (N×M) kinds of orthogonal code sequences; and
an orthogonal code multiplier which multiplies transmission codes of the N kinds of transmission code sequences with N orthogonal codes which are used in the M-th transmission period in the (N×M) kinds of orthogonal code sequences.

3. The radar device according to claim 1, further comprising:
a radio receiver which receives, through a reception antenna, reflected wave signals that are obtained by reflecting the N transmission pulses from a target, and which produces N baseband reception pulses;
N correlation calculators which calculate correlation values between the N transmission pulses in which the N orthogonal codes are multiplied, and the N reception pulses; and
a coherent adder which adds together the correlation values that are calculated over the M transmission periods.

4. The radar device according to claim 1, further comprising:
a radio receiver which receives, through a reception antenna, reflected wave signals that are obtained by reflecting the N transmission pulses from a target, and which produces N baseband reception pulses;
(N−1) delaying devices which provide amounts of delay corresponding to from a time difference of transmission timings of first and second transmission pulses of the N transmission pulses, to a time difference of transmission timings of the first and N-th transmission pulses, to (N−1) reception pulses of the N reception pulses;
an adder which adds together the (N−1) reception pulses to which the amounts of delay are provided, and the one reception pulse to which the amounts of delay are not provided;
a correlation calculator which calculates correlation values between the N transmission pulses in which the N orthogonal codes are multiplied, and an output of the adder; and
a coherent adder which adds together the correlation values that are calculated over the M transmission periods.

5. The radar device according to claim 4, wherein the correlation calculator calculates the correlation values by using a result of addition of codes of the N transmission pulses as a correlation coefficient.

6. The radar device according to claim 1, further comprising:

a transmission timing controller which, for every M transmission periods, outputs a transmission timing control signal for changing intervals of transmission timings of at least two transmission pulses of the N transmission pulses, wherein the transmission signal generator changes intervals of transmission timings of at least two transmission pulses of the N transmission pulses, based on the transmission timing control signal.

7. The radar device according to claim 1, further comprising:

a transmission beam controller which outputs N times in one transmission period a transmission beam control signal indicating different main beam directions of the N transmission pulses in the transmission period, wherein the radio transmitter transmits the N transmission pulses while switching the main beam directions based on the transmission beam control signal.

* * * * *